United States Patent
Balasubramanian et al.

(10) Patent No.: US 11,950,246 B2
(45) Date of Patent: Apr. 2, 2024

(54) SIDELINK VEHICLE TO VULNERABLE ROAD USER TECHNIQUES FOR WIRELESS COMMUNICATIONS SYSTEMS

(71) Applicant: QUALCOMM Incorporated, San Diego, CA (US)

(72) Inventors: Anantharaman Balasubramanian, San Diego, CA (US); Wanshi Chen, San Diego, CA (US); Gabi Sarkis, San Diego, CA (US); Shuanshuan Wu, San Diego, CA (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/231,951

(22) Filed: Apr. 15, 2021

(65) Prior Publication Data

US 2021/0329678 A1 Oct. 21, 2021

Related U.S. Application Data

(60) Provisional application No. 63/011,840, filed on Apr. 17, 2020.

(51) Int. Cl.
*H04W 76/14* (2018.01)
*H04W 72/23* (2023.01)
(Continued)

(52) U.S. Cl.
CPC ......... *H04W 72/23* (2023.01); *H04W 72/542* (2023.01); *H04W 72/56* (2023.01); *H04W 76/14* (2018.02)

(58) Field of Classification Search
None
See application file for complete search history.

(56) References Cited

U.S. PATENT DOCUMENTS

2016/0309447 A1 10/2016 Agiwal et al.
2018/0042023 A1* 2/2018 Sheng ............... H04W 4/40
(Continued)

FOREIGN PATENT DOCUMENTS

CN 108093464 A * 5/2018 ........ H04W 52/0216
EP 3437346 A1 2/2019
(Continued)

OTHER PUBLICATIONS

"Discussion on V2P design aspects", R1-162420, ZTE, 3GPP TSG RAN WG1 Meeting #84bis, Apr. 2016 (Year: 2016).*
(Continued)

*Primary Examiner* — Jenkey Van
(74) *Attorney, Agent, or Firm* — Holland & Hart LLP/QUALCOMM Incorporated

(57) ABSTRACT

Methods, systems, and devices for wireless communications are described. A first wireless device may receive an indication of one or more parameters for communications over a sidelink channel during a first time period, where the one or more parameters may include a time threshold for a second resource pool. The wireless device may transmit data over a first resource pool of the sidelink channel during a first portion of the first time period based on the one or more parameters, the first resource pool including resources for communications between the first wireless device and a second wireless device. The wireless device may monitor the second resource pool during a second portion of the first (Continued)

time period for the time threshold, the second resource pool including resources for communications between the first wireless device and a third wireless device.

43 Claims, 16 Drawing Sheets

(51) Int. Cl.
*H04W 72/542* (2023.01)
*H04W 72/56* (2023.01)

(56) References Cited

U.S. PATENT DOCUMENTS

| | | | |
|---|---|---|---|
| 2018/0124771 A1* | 5/2018 | Mok | H04W 72/51 |
| 2019/0349952 A1* | 11/2019 | Uchiyama | G08G 1/0965 |
| 2019/0357025 A1 | 11/2019 | Hwang et al. | |
| 2020/0077407 A1 | 3/2020 | Srivastava et al. | |
| 2021/0152992 A1* | 5/2021 | Balasubramanian | ........................ H04W 68/02 |
| 2021/0314796 A1* | 10/2021 | Hoang | H04W 52/36 |

FOREIGN PATENT DOCUMENTS

| | | |
|---|---|---|
| WO | WO-2017136627 A1 | 8/2017 |
| WO | WO-2018175528 A1 | 9/2018 |

OTHER PUBLICATIONS

International Search Report and Written Opinion—PCT/US2021/027696—ISA/EPO—dated Aug. 30, 2021.
Partial International Search Report—PCT/US2021/027696—ISA/EPO—dated Jul. 17, 2021.
XINWEI: "Details of Partial Sensing by P-UEs", 3GPP Draft, 3GPP TSG-RAN WG1 Meeting # 88, R1-1720219 Details of Partial Sensing by P-UEs, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017 Feb. 12, 2017 (Feb. 12, 2017), XP051209181, pp. 1-3, Retrieved from the Internet: URL:http://www.3gpp.org/ftp/Meetings_3GPP_SYNC/RAN1/Docs/ [retrieved on Feb. 12, 2017] Section 4.

* cited by examiner

US 11,950,246 B2

SIDELINK VEHICLE TO VULNERABLE ROAD USER TECHNIQUES FOR WIRELESS COMMUNICATIONS SYSTEMS

CROSS REFERENCE

The present Application for Patent claims the benefit of U.S. Provisional Patent Application No. 63/011,840 by Balasubramanian et al., entitled "SIDELINK VEHICLE TO PEDESTRIAN TECHNIQUES FOR WIRELESS COMMUNICATIONS SYSTEMS," filed Apr. 17, 2020, assigned to the assignee hereof, and expressly incorporated by reference herein.

INTRODUCTION

The following relates to wireless communications and more specifically to sidelink techniques for wireless communications systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first wireless device is described. The method may include receiving an indication of one or more parameters for communications over a sidelink channel during a first time period, the one or more parameters including a time threshold for a second resource pool, transmitting data over a first resource pool of the sidelink channel during a first portion of the first time period based on the one or more parameters, the first resource pool including resources for communications between the first wireless device and a second wireless device, and monitoring the second resource pool during a second portion of the first time period for the time threshold, the second resource pool including resources for communications between the first wireless device and a third wireless device.

An apparatus for wireless communications at a first wireless device is described. The apparatus may include a processor and memory coupled with the processor. The processor and memory may be configured to receive an indication of one or more parameters for communications over a sidelink channel during a first time period, the one or more parameters including a time threshold for a second resource pool, transmit data over a first resource pool of the sidelink channel during a first portion of the first time period based on the one or more parameters, the first resource pool including resources for communications between the first wireless device and a second wireless device, and monitor the second resource pool during a second portion of the first time period for the time threshold, the second resource pool including resources for communications between the first wireless device and a third wireless device.

Another apparatus for wireless communications at a first wireless device is described. The apparatus may include means for receiving an indication of one or more parameters for communications over a sidelink channel during a first time period, the one or more parameters including a time threshold for a second resource pool, means for transmitting data over a first resource pool of the sidelink channel during a first portion of the first time period based on the one or more parameters, the first resource pool including resources for communications between the first wireless device and a second wireless device, and means for monitoring the second resource pool during a second portion of the first time period for the time threshold, the second resource pool including resources for communications between the first wireless device and a third wireless device.

A non-transitory computer-readable medium storing code for wireless communications at a first wireless device is described. The code may include instructions executable by a processor to receive an indication of one or more parameters for communications over a sidelink channel during a first time period, the one or more parameters including a time threshold for a second resource pool, transmit data over a first resource pool of the sidelink channel during a first portion of the first time period based on the one or more parameters, the first resource pool including resources for communications between the first wireless device and a second wireless device, and monitor the second resource pool during a second portion of the first time period for the time threshold, the second resource pool including resources for communications between the first wireless device and a third wireless device.

In some examples of the method, apparatuses, and non-transitory computer-readable medium described herein, the first wireless device includes a vehicle user equipment (UE), the second wireless device includes a second vehicle UE (V-UE), the third wireless device includes a UE associated with a vulnerable road user (VRU), or any combination thereof.

In some examples of the method, apparatuses, and non-transitory computer-readable medium described herein, the first wireless device includes a pedestrian UE (P-UE).

Some examples of the method, apparatuses, and non-transitory computer-readable medium described herein may further include operations, features, means, or instructions for identifying a geographic zone identifier corresponding to the communications over the sidelink channel, where identifying the one or more parameters may be based on the geographic zone identifier.

In some examples of the method, apparatuses, and non-transitory computer-readable medium described herein, the one or more parameters indicate a duration of the first portion of the first time period, a duration of the second portion of the first time period, or both.

Some examples of the method, apparatuses, and non-transitory computer-readable medium described herein may further include operations, features, means, or instructions for identifying a second geographic zone identifier at a second time period subsequent the first time period, identifying a set of parameters for communications over the sidelink channel during the second time period based on the second geographic zone identifier, transmitting second data over the first resource pool of the sidelink channel during a first portion of the second time period based on the set of parameters, and monitoring the second resource pool during a second portion of the second time period based on the set of parameters.

Some examples of the method, apparatuses, and non-transitory computer-readable medium described herein may further include operations, features, means, or instructions for calculating a channel busy ratio (CBR) of the second resource pool and adapting a priority associated with transmitting the data over the first resource pool, a priority associated with monitoring the second resource pool, or both based on the calculated CBR.

In some examples of the method, apparatuses, and non-transitory computer-readable medium described herein, calculating the CBR may include operations, features, means, or instructions for determining, for one or more occasions prior to the first time period, a quantity of subchannels with a received signal strength indicator that satisfies a configured threshold.

Some examples of the method, apparatuses, and non-transitory computer-readable medium described herein may further include operations, features, means, or instructions for comparing the CBR to a threshold, where adapting the priority associated with transmitting the data over the first resource pool, the priority associated with monitoring the second resource pool, or both may be based on the comparison.

In some examples of the method, apparatuses, and non-transitory computer-readable medium described herein, adapting the priority associated with transmitting the data over the first resource pool may include operations, features, means, or instructions for determining that the CBR fails to satisfy the threshold based on comparing the CBR to the threshold and determining that the first portion of the first time period satisfies a second time threshold associated with transmitting the data over the first resource pool, the second time threshold including a percentage of the first time period.

In some examples of the method, apparatuses, and non-transitory computer-readable medium described herein, adapting the priority associated with transmitting the data over the first resource pool may include operations, features, means, or instructions for determining that the CBR satisfies the threshold based on comparing the CBR to the threshold and determining that the second portion of the first time period satisfies the time threshold associated with monitoring the second resource pool, the time threshold including a percentage of the first time period.

Some examples of the method, apparatuses, and non-transitory computer-readable medium described herein may further include operations, features, means, or instructions for transmitting, during a second time period, a paging indication to the third wireless device and communicating with the third wireless device over a third resource pool during a third time period based on transmitting the paging indication, the third resource pool including resources for communications from the first wireless device to the third wireless device.

In some examples of the method, apparatuses, and non-transitory computer-readable medium described herein, the paging indication indicates a duration of the third time period, one or more resources during the third time period allocated for communications between the first wireless device and the third wireless device, or both.

In some examples of the method, apparatuses, and non-transitory computer-readable medium described herein, the first resource pool, the second resource pool, and the third resource pool may be frequency division multiplexed during the first time period, the second time period, and the third time period.

In some examples of the method, apparatuses, and non-transitory computer-readable medium described herein, identifying the one or more parameters may include operations, features, means, or instructions for receiving a control message indicating the one or more parameters from a base station, a roadside unit, or both.

In some examples of the method, apparatuses, and non-transitory computer-readable medium described herein, the control message includes a radio resource control (RRC) reconfiguration message.

In some examples of the method, apparatuses, and non-transitory computer-readable medium described herein, the second resource pool includes a common resource pool for communications between V-UEs and the first resource pool includes resources for communications between V-UEs and UEs associated with one or more VRUs.

Some examples of the method, apparatuses, and non-transitory computer-readable medium described herein may further include operations, features, means, or instructions for determining that the first portion of the first time period satisfies a threshold quantity of consecutive symbols associated with transmitting the data over the first resource pool.

Some examples of the method, apparatuses, and non-transitory computer-readable medium described herein may further include operations, features, means, or instructions for identifying a second quantity of consecutive symbols based on the time threshold of the one or more parameters, where monitoring the second resource pool during the second portion of the first time period includes monitoring the second resource pool during the second quantity of consecutive symbols.

Some examples of the method, apparatuses, and non-transitory computer-readable medium described herein may further include operations, features, means, or instructions for determining that the second portion of the first time period satisfies the time threshold associated with monitoring the second resource pool, the time threshold including a percentage of the first time period.

A method for wireless communications at a wireless device is described. The method may include receiving an indication of one or more conditions associated with a second wireless device, the one or more conditions corresponding to communications of the second wireless device over a sidelink channel, transmitting a first message indicating one or more parameters for communications of the second wireless device over the sidelink channel during a first time period, the one or more parameters based on the one or more conditions associated with the second wireless device, and transmitting a second message based on a condition of the one or more conditions satisfying a threshold.

An apparatus for wireless communications at a wireless device is described. The apparatus may include a processor, memory coupled with the processor, and may include a processor and memory coupled with the processor. The processor and memory may be configured to. The instructions may be executable by the processor to cause the apparatus to receive an indication of one or more conditions associated with a second wireless device, the one or more conditions corresponding to communications of the second wireless device over a sidelink channel, transmit a first message indicating one or more parameters for communications of the second wireless device over the sidelink channel during a first time period, the one or more parameters based on the one or more conditions associated with the second wireless device, and transmit a second message based on a condition of the one or more conditions satisfying a threshold.

Another apparatus for wireless communications at a wireless device is described. The apparatus may include means for receiving an indication of one or more conditions associated with a second wireless device, the one or more conditions corresponding to communications of the second wireless device over a sidelink channel, means for transmitting a first message indicating one or more parameters for communications of the second wireless device over the sidelink channel during a first time period, the one or more parameters based on the one or more conditions associated with the second wireless device, and means for transmitting a second message based on a condition of the one or more conditions satisfying a threshold.

A non-transitory computer-readable medium storing code for wireless communications at a wireless device is described. The code may include instructions executable by a processor to receive an indication of one or more conditions associated with a second wireless device, the one or more conditions corresponding to communications of the second wireless device over a sidelink channel, transmit a first message indicating one or more parameters for communications of the second wireless device over the sidelink channel during a first time period, the one or more parameters based on the one or more conditions associated with the second wireless device, and transmit a second message based on a condition of the one or more conditions satisfying a threshold.

Some examples of the method, apparatuses, and non-transitory computer-readable medium described herein may further include operations, features, means, or instructions for identifying a set of parameters different than the one or more parameters, the set of parameters corresponding to communications of the second wireless device over the sidelink channel during a second time period and transmitting a third message indicating the set of parameters to the second wireless device.

In some examples of the method, apparatuses, and non-transitory computer-readable medium described herein, the condition includes a safety condition and the threshold includes a safety threshold and the second message includes safety information.

In some examples of the method, apparatuses, and non-transitory computer-readable medium described herein, transmitting the first message may include operations, features, means, or instructions for transmitting an RRC reconfiguration message indicating the one or more parameters.

In some examples of the method, apparatuses, and non-transitory computer-readable medium described herein, the wireless device includes a base station, a roadside unit (RSU), or both.

In some examples of the method, apparatuses, and non-transitory computer-readable medium described herein, the second wireless device includes a V-UE.

A method of wireless communications at a first wireless device is described. The method may include identifying one or more parameters for communications over a sidelink channel during a first time period, transmitting data over a first resource pool of the sidelink channel during a first portion of the first time period based on the one or more parameters, the first resource pool including resources for communications between the first wireless device and a second wireless device, and monitoring a second resource pool during a second portion of the first time period based on a time threshold of the one or more parameters, the second resource pool including resources for communications between the first wireless device and a third wireless device.

An apparatus for wireless communications at a first wireless device is described. The apparatus may include a processor and memory coupled with the processor. The processor and memory may be configured to identify one or more parameters for communications over a sidelink channel during a first time period, transmit data over a first resource pool of the sidelink channel during a first portion of the first time period based on the one or more parameters, the first resource pool including resources for communications between the first wireless device and a second wireless device, and monitor a second resource pool during a second portion of the first time period based on a time threshold of the one or more parameters, the second resource pool including resources for communications between the first wireless device and a third wireless device.

Another apparatus for wireless communications at a first wireless device is described. The apparatus may include means for identifying one or more parameters for communications over a sidelink channel during a first time period, transmitting data over a first resource pool of the sidelink channel during a first portion of the first time period based on the one or more parameters, the first resource pool including resources for communications between the first wireless device and a second wireless device, and monitoring a second resource pool during a second portion of the first time period based on a time threshold of the one or more parameters, the second resource pool including resources for communications between the first wireless device and a third wireless device.

A non-transitory computer-readable medium storing code for wireless communications at a first wireless device is described. The code may include instructions executable by a processor to identify one or more parameters for communications over a sidelink channel during a first time period, transmit data over a first resource pool of the sidelink channel during a first portion of the first time period based on the one or more parameters, the first resource pool including resources for communications between the first wireless device and a second wireless device, and monitor a second resource pool during a second portion of the first time period based on a time threshold of the one or more parameters, the second resource pool including resources for communications between the first wireless device and a third wireless device.

Some examples of the method, apparatuses, and non-transitory computer-readable medium described herein may further include operations, features, means, or instructions for determining that the first portion of the first time period satisfies a threshold quantity of consecutive symbols associated with transmitting the data over the first resource pool.

Some examples of the method, apparatuses, and non-transitory computer-readable medium described herein may further include operations, features, means, or instructions for identifying a second quantity of consecutive symbols based on the time threshold of the one or more parameters, where monitoring the second resource pool during the second portion of the first time period includes monitoring the second resource pool during the second quantity of consecutive symbols.

Some examples of the method, apparatuses, and non-transitory computer-readable medium described herein may further include operations, features, means, or instructions for determining that the second portion of the first time period satisfies the time threshold associated with monitoring the second resource pool, the time threshold including a percentage of the first time period.

Some examples of the method, apparatuses, and non-transitory computer-readable medium described herein may further include operations, features, means, or instructions for identifying a geographic zone identifier corresponding to the communications over the sidelink channel, where identifying the one or more parameters may be based on the geographic zone identifier.

In some examples of the method, apparatuses, and non-transitory computer-readable medium described herein, the one or more parameters indicate a duration of the first portion of the first time period, a duration of the second portion of the first time period, or both.

Some examples of the method, apparatuses, and non-transitory computer-readable medium described herein may further include operations, features, means, or instructions for identifying a second geographic zone identifier at a second time period subsequent the first time period, identifying a set of parameters for communications over the sidelink channel during the second time period based on the second geographic zone identifier, transmitting second data over the first resource pool of the sidelink channel during a first portion of the second time period based on the set of parameters, and monitoring the second resource pool during a second portion of the second time period based on the set of parameters.

Some examples of the method, apparatuses, and non-transitory computer-readable medium described herein may further include operations, features, means, or instructions for calculating a CBR of the second resource pool, and adapting a priority associated with transmitting the data over the first resource pool, a priority associated with monitoring the second resource pool, or both based on the calculated CBR.

In some examples of the method, apparatuses, and non-transitory computer-readable medium described herein, calculating the CBR may include operations, features, means, or instructions for determining, for one or more occasions prior to the first time period, a quantity of subchannels with a received signal strength indicator that satisfies a configured threshold.

Some examples of the method, apparatuses, and non-transitory computer-readable medium described herein may further include operations, features, means, or instructions for comparing the CBR to a threshold, where adapting the priority associated with transmitting the data over the first resource pool, the priority associated with monitoring the second resource pool, or both may be based on the comparison.

In some examples of the method, apparatuses, and non-transitory computer-readable medium described herein, adapting the priority associated with transmitting the data over the first resource pool may include operations, features, means, or instructions for determining that the CBR fails to satisfy the threshold based on comparing the CBR to the threshold, and determining that the first portion of the first time period satisfies a second time threshold associated with transmitting the data over the first resource pool, the second time threshold including a percentage of the first time period.

In some examples of the method, apparatuses, and non-transitory computer-readable medium described herein, adapting the priority associated with transmitting the data over the first resource pool may include operations, features, means, or instructions for determining that the CBR satisfies the threshold based on comparing the CBR to the threshold, and determining that the second portion of the first time period satisfies the time threshold associated with monitoring the second resource pool, the time threshold including a percentage of the first time period.

Some examples of the method, apparatuses, and non-transitory computer-readable medium described herein may further include operations, features, means, or instructions for transmitting, during a second time period, a paging indication to the third wireless device, and communicating with the third wireless device over a third resource pool during a third time period based on transmitting the paging indication, the third resource pool including resources for communications from the first wireless device to the third wireless device.

In some examples of the method, apparatuses, and non-transitory computer-readable medium described herein, the paging indication indicates a duration of the third time period, one or more resources during the third time period allocated for communications between the first wireless device and the third wireless device, or both.

In some examples of the method, apparatuses, and non-transitory computer-readable medium described herein, the first resource pool, the second resource pool, and the third resource pool may be frequency division multiplexed during the first time period, the second time period, and the third time period.

In some examples of the method, apparatuses, and non-transitory computer-readable medium described herein, identifying the one or more parameters may include operations, features, means, or instructions for receiving a control message indicating the one or more parameters from a base station, an RSU, or both.

In some examples of the method, apparatuses, and non-transitory computer-readable medium described herein, the control message includes a RRC reconfiguration message.

In some examples of the method, apparatuses, and non-transitory computer-readable medium described herein, the first wireless device includes a V-UE, the second wireless device includes a second V-UE, the third wireless device includes a UE associated with a VRU, or any combination thereof.

In some examples of the method, apparatuses, and non-transitory computer-readable medium described herein, the second resource pool includes a common resource pool for communications between V-UEs and the first resource pool includes resources for communications between V-UEs and UEs associated with one or more VRUs.

A method of wireless communications at a wireless device is described. The method may include identifying one or more parameters for communications of a second wireless device over a sidelink channel during a first time period and transmitting a control message indicating the one or more parameters to the second wireless device.

An apparatus for wireless communications at a wireless device is described. The apparatus may include a processor and memory coupled to the processor, the processor and memory configured to identify one or more parameters for communications of a second wireless device over a sidelink channel during a first time period and transmit a control message indicating the one or more parameters to the second wireless device.

Another apparatus for wireless communications at a wireless device is described. The apparatus may include means for identifying one or more parameters for communications of a second wireless device over a sidelink channel during a first time period and transmitting a control message indicating the one or more parameters to the second wireless device.

A non-transitory computer-readable medium storing code for wireless communications at a wireless device is described. The code may include instructions executable by a processor to identify one or more parameters for communications of a second wireless device over a sidelink channel during a first time period and transmit a control message indicating the one or more parameters to the second wireless device.

In some examples of the method, apparatuses, and non-transitory computer-readable medium described herein, transmitting the control message may include operations, features, means, or instructions for transmitting a RRC reconfiguration message indicating the one or more parameters.

Some examples of the method, apparatuses, and non-transitory computer-readable medium described herein may further include operations, features, means, or instructions for identifying a set of parameters different than the one or more parameters, the set of parameters corresponding to communications of the second wireless device over the sidelink channel during a second time period, and transmitting a second control message indicating the set of parameters to the second wireless device.

In some examples of the method, apparatuses, and non-transitory computer-readable medium described herein, the wireless device includes a base station, an RSU, or both.

In some examples of the method, apparatuses, and non-transitory computer-readable medium described herein, the second wireless device includes a V-UE.

DETAILED DESCRIPTION

Figure 1:
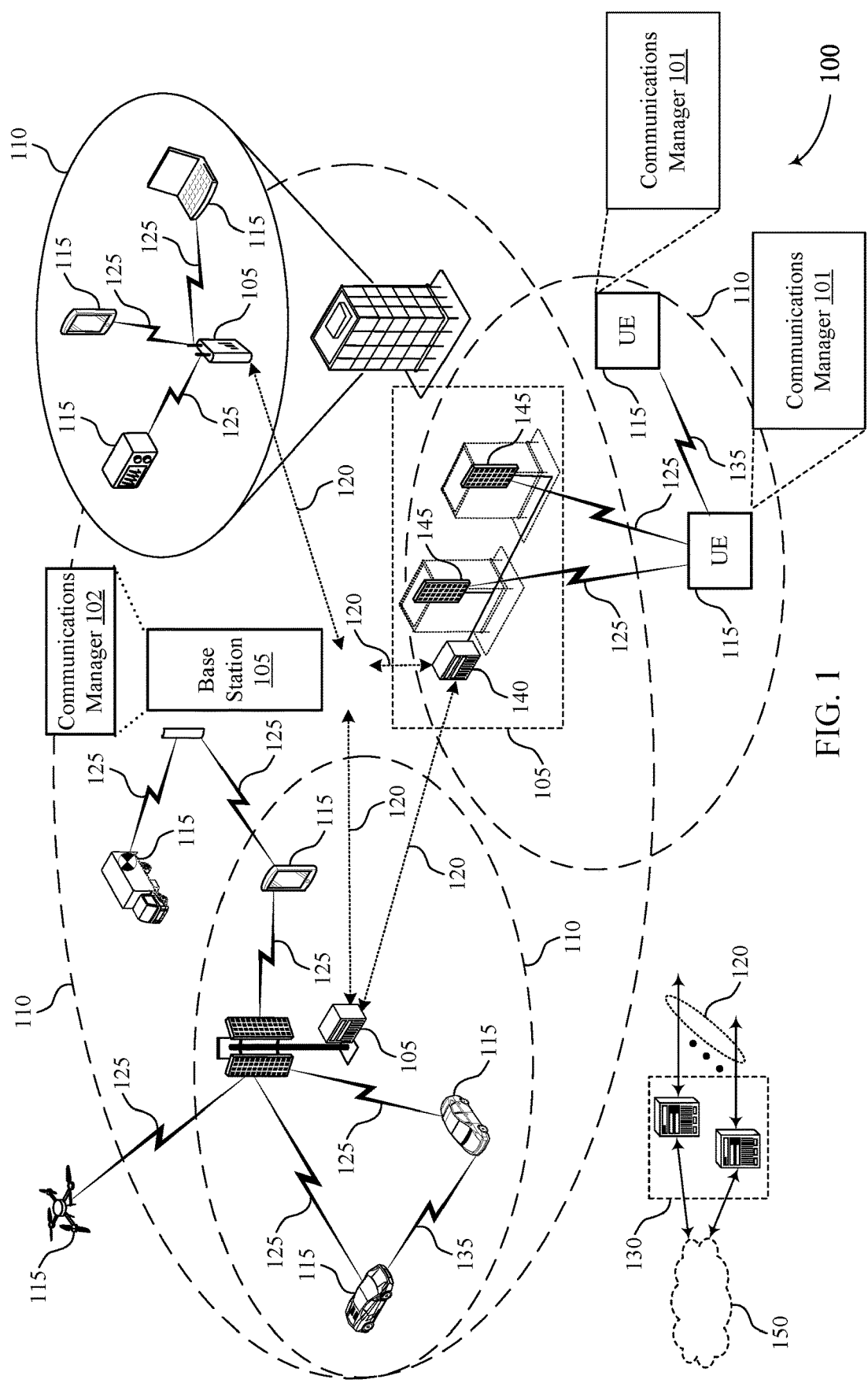
FIG. 1 illustrates an example of a wireless communications system that supports sidelink vehicle to vulnerable road user (VRU) techniques for wireless communications systems in accordance with one or more aspects of the present disclosure.

Some wireless communication systems may support communications between multiple wireless devices, which may be otherwise known as a user equipment (UE). For example, a system may support device-to-device (D2D) communications, which may include vehicle-based communications, such as vehicle-to-pedestrian (V2P) communications, vehicle-to-everything (V2X) communications, vehicle-to-vehicle (V2V) communications, and the like. Some such communications may occur between a vehicle (e.g., a vehicle UE, which may be referred to as a "V-UE") and a UE associated with a vulnerable road user (VRU), such as a UE carried by a pedestrian (e.g., a pedestrian UE, which may be referred to as a "P-UE"), a UE associated with a bicyclist, other V-UEs, among other examples of VRUs. In some examples, communications between a V-UE and a UE associated with a VRU may occur over a direct connection, such as a sidelink connection (e.g., communications via a sidelink channel such as a PC5 interface). As an illustrative example, V-UEs and P-UEs may exchange information via V2P messages and pedestrian-to-vehicle (P2V) messages using the sidelink connection.

In some examples, the techniques described herein may enhance safety in wireless communications systems. For example, a UE (e.g., V-UEs) may operate in a half-duplex mode and may be unable to monitor for communications from some UEs (e.g., P-UEs) while transmitting data to other UEs (e.g., other V-UEs). In such examples, the UE may fail to receive safety information (e.g., such as one or more safety conditions of other devices) while transmitting the data. Additionally or alternatively, the UE may monitor for communications from some UEs and may be unable to transmit data to other UEs while performing the monitoring, which may result in the UE utilizing relatively less resources.

Accordingly, wireless devices (e.g., UEs, roadside units (RSUs), base stations, or the like) may implement one or more techniques as described herein which may result in enhanced safety and efficiency of wireless communications systems. For example, a wireless device may communicate with other wireless devices using one or more resource pools. As an illustrative example, the wireless device may be an example of a V-UE and may communicate with other UEs (e.g., other V-UEs) using a common resource pool. The wireless device may monitor for communications from other UEs using a P2V resource pool (e.g., resources allocated for communications from UEs associated with VRUs, such as P-UEs). The wireless device may transmit communications to other UEs using a V2P resource pool (e.g., resources allocated for communication to other UEs associated with VRUs, such as pedestrians). In some examples, the wireless device may receive data via the P2V resource pool. The wireless device may transmit a paging indication to other UEs based on the received data. The paging indication may indicate resources (e.g., frequency resources, time resources) associated with the V2P resource pool. Such resources may be dynamically configured (e.g., a length of a time period for the V2P resource pool may vary, the resources for the V2P pool may be allocated to different portions of the common resource pool for different time periods, or the like). Thus, the wireless device may communicate with other UEs relatively efficiently.

In some examples, a wireless device may be configured with a common resource pool of a sidelink channel, a P2V resource pool, or both. The wireless device may monitor the P2V resource pool for communications from other wireless devices (e.g., P-UEs). Additionally or alternatively, the wireless device may transmit data to other UEs (e.g., V-UEs) via the common resource pool. The wireless device may identify one or more parameters (e.g., rules) for communications over the sidelink channel. In some examples, the one or more parameters may indicate a time threshold (e.g., a threshold quantity of time resources such as symbols or slots, a threshold percentage of a time period for monitoring and/or transmitting over a resource pool, or the like). In some examples, the wireless device may identify a geographic zone identifier (ID) associated with a geographic area of the wireless communications system. In such examples, the one or more parameters may correspond to the geographic zone ID. In some examples, the wireless device may calculate a channel busy ratio (CBR) associated with the sidelink channel (e.g., a CBR of the P2V pool). The wireless device may compare the CBR to a threshold, and select or identify the one or more parameters based on whether the CBR satisfies the threshold. In some examples, the wireless device may receive control signaling indicating a reconfiguration of the one or more parameters. For example, a roadside unit (RSU) may transmit a radio resource control (RRC) reconfiguration message indicating an updated set of rules.

In some examples, by monitoring the P2V resource pool using the one or more parameters (e.g., for a time threshold), a wireless communications system may realize efficient communications (e.g., relatively high resource utilization), enhanced safety in the system, or both.

Aspects of the disclosure are initially described in the context of wireless communications systems. Aspects of the disclosure are also described in the context of resource schemes. Aspects of the disclosure are further illustrated by and described with reference to apparatus diagrams, system diagrams, and flowcharts that relate to sidelink vehicle to VRU techniques for wireless communications systems.

FIG. 1 illustrates an example of a wireless communications system 100 that supports sidelink vehicle to VRU techniques for wireless communications systems in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, V2P communications, P2V communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as RSUs, or with the network via one or more network nodes (e.g., base stations 105) using vehicle-to-network (V2N) communications, or with both. In some examples, UEs 115 may be P-UEs 115 or V-UEs 115, or a combination thereof.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in some cases, in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, the wireless communications system 100 may support communications between vehicles (e.g., V-UEs 115) and UEs 115 associated with VRUs (e.g., P-UEs 115). A wireless device (e.g., a UE 115, a base station 105, an RSU) may communicate with other wireless devices using one or more resource pools. For example, a UE 115 may include a communications manager 101 which may enable the UE 115 to implement the techniques and operations described herein (e.g., each UE 115 may include a respective communications manager 101). The communications manager 101 may be an example of a communications manager 415 as described herein. Additionally or alternatively, a base station 105 or an RSU may include a communications manager 102 which may enable the RSU or the base station 105 to implement the techniques and operations described herein. The communications manager 102 may be an example of a communications manager 815 as described herein.

As an illustrative example, the wireless device may be an example of a V-UE 115 and may communicate with other UEs 115 (e.g., other V-UEs 115) using a common resource pool of a sidelink channel. Additionally or alternatively, the wireless device may monitor for communications from other UEs 115 using a P2V resource pool of a sidelink channel (e.g., resources allocated for communications from UEs 115 associated with VRUs, such as P-UEs 115). Additionally or alternatively, the wireless device may transmit communications to other UEs 115 using a V2P resource pool (e.g., resources allocated for communication to other UEs 115 associated with VRUs). In some examples, the sidelink channel may implement FDM (e.g., the common resource pool, the P2V resource pool, and the V2P resource pool may include the same time resources and different frequency resources).

In some examples, the wireless device may receive data during a first time period (e.g., via the P2V resource pool) and transmit a paging indication to other wireless devices based on the received data. The paging indication may indicate resources (e.g., frequency resources, time resources) associated with the V2P resource pool in a second time period. Such resources may be dynamically configured (e.g., a length of the second time period may vary, the resources for the V2P pool may be allocated to different portions of the common resource pool for different time periods, or the like). Thus, the wireless device may communicate with other wireless devices (e.g., safety information, collision warnings) relatively efficiently.

Additionally or alternatively, the described techniques may enable the various devices to implement one or more priority schemes. For example, a wireless device may be configured with a common resource pool during a first time period and a P2V resource pool during the first time period. In some examples, the wireless device may monitor the P2V resource pool for communications from other wireless devices (e.g., P-UEs 115), or the wireless device may transmit data to other UEs (e.g., V-UEs 115) via the common resource pool. The wireless device may identify one or more parameters (e.g., rules) for such communications over the sidelink channel. In some examples, the one or more parameters may indicate a time threshold (e.g., a threshold quantity of time resources such as symbols or slots, a threshold percentage of the first time period for monitoring and/or transmitting over a resource pool, or the like). In some examples, the wireless device may identify a geographic zone ID associated with a geographic area of the wireless communications system (e.g., a geographic coverage area 110). In such examples, the one or more parameters may correspond to the geographic zone ID (e.g., the wireless device may identify the one or more parameters based on the geographic zone ID). In some examples, the wireless device may calculate a CBR associated with the sidelink channel (e.g., a CBR of the P2V pool). The wireless device may compare the CBR to a threshold and identify the one or more parameters based on the comparison. In some examples, the wireless device may receive control signaling indicating a reconfiguration of the one or more parameters (e.g., an RRC reconfiguration message indicating an updated set of rules may be transmitted from an RSU, a base station 105, another UE 115, or the like).

Figure 2:
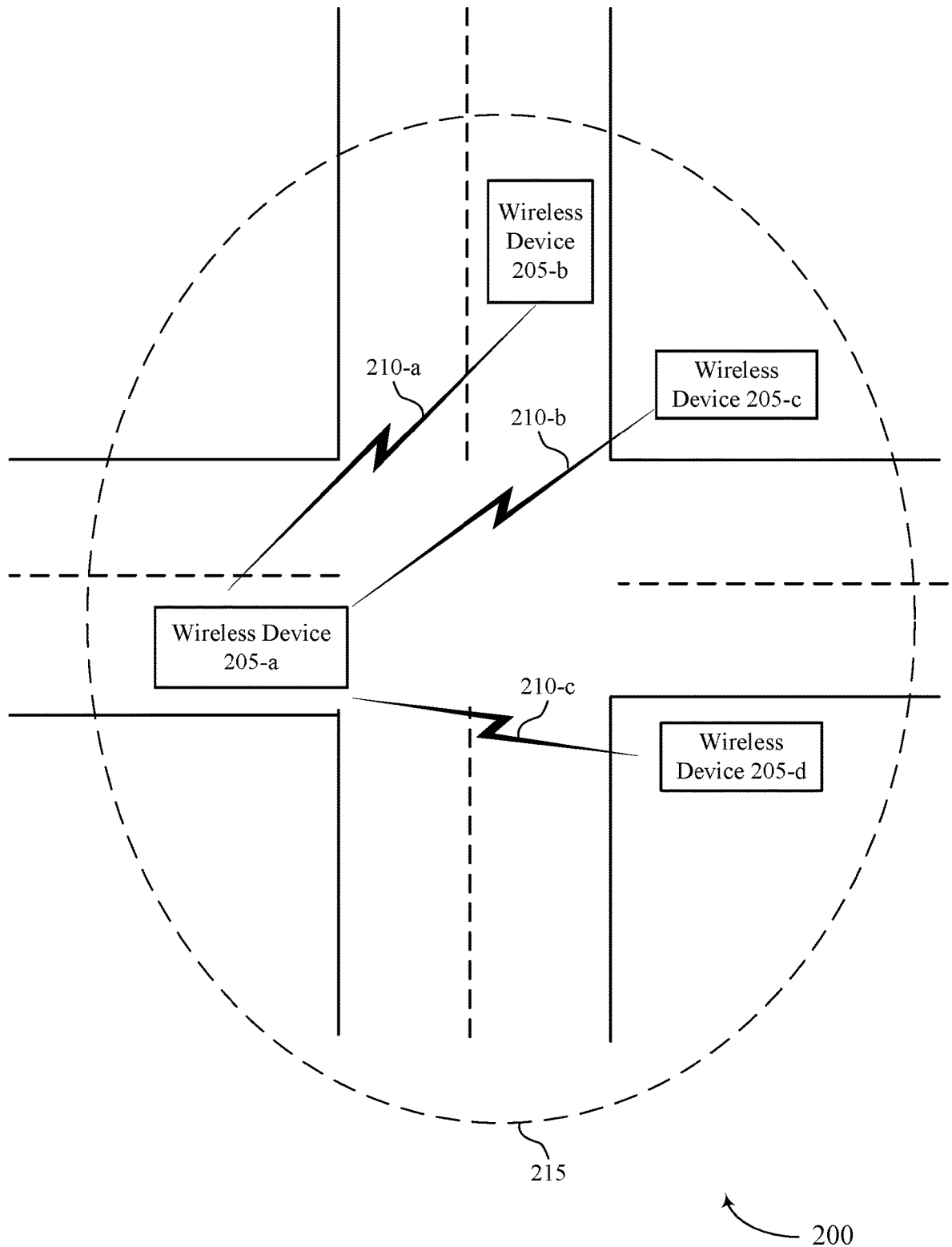
FIG. 2 illustrates an example of a wireless communications system that supports sidelink vehicle to VRU techniques for wireless communications systems in accordance with one or more aspects of the present disclosure.

FIG. 2 illustrates an example of a wireless communications system 200 that supports sidelink vehicle to VRU techniques for wireless communications systems in accordance with one or more aspects of the present disclosure. In some examples, the wireless communications system 200 may implement aspects of wireless communication system 100. For example, the wireless devices 205 may be an example of one or more aspects of the UE 115, the base station 105, or an RSU as described with reference to FIG. 1.

As an illustrative example, the wireless device 205-*a* may be an example of a vehicle (e.g., a V-UE 115) and the wireless devices 205-*b* and 205-*d* may be examples of UEs associated with VRUs (e.g., a P-UE 115). Stated alternatively, the wireless devices 205-*b* and 205-*d* may be examples of wireless devices 205 associated with pedestrians or other VRUs. The wireless devices 205-*a*, 205-*b*, and 205-*c* may communicate over a sidelink channel. For example, the wireless device 205-*a* and the wireless device 205-*b* may send or receive transmission via the communications link 210-*a*, which may be an example of a communications link 135 as described with reference to FIG. 1. In some cases, the communications link 210-*a* may illustrate a direct connection between devices (e.g., a sidelink channel such as a PC5 interface). In some examples, the wireless device 205-*c* may be an example of an RSU or a base station 105, as described with reference to FIG. 1. For example, the wireless device 205-*c* and the wireless device 205-*a* may communicate over the communications link 210-*b*, which may be an example of a communications link 125 as described with reference to FIG. 1.

The wireless device 205-*a* may implement aspects of a V2P system, for example, in order to provide for enhanced safety for the wireless device 205-*a* or other VRUs (e.g., bicyclists, vehicles, pedestrians, or the like). In some examples, the wireless device 205-*a* may transmit a paging indication to another wireless device 205, such as the wireless device 205-*d* (e.g., a UE associated with a pedestrian). For example, the wireless device 205-a may determine that a pedestrian associated with the wireless device 205-d is in a collision course with the wireless device 205-a. The wireless device 205-a may transmit a paging indication indicating the collision course to the wireless device 205-d, among other types of communications (e.g., safety information, an indication of resources for subsequent communications, or other data).

In some examples, the wireless device 205-a may operate in a half-duplex mode and may be unable to monitor for communications from the wireless device 205-d while transmitting data to other wireless devices 205 (e.g., other vehicles, the wireless device 205-c, the wireless device 205-b, or the like). In such examples, the wireless device 205-a may fail to receive safety information from the wireless device 205-d while transmitting data to one or more wireless devices 205. Additionally or alternatively, the wireless device 205-a may monitor for communications from the wireless device 205-d, but may be unable to transmit data while performing the monitoring, which may result in relatively inefficient communications (e.g., relatively poor resource utilization).

Figure 3:
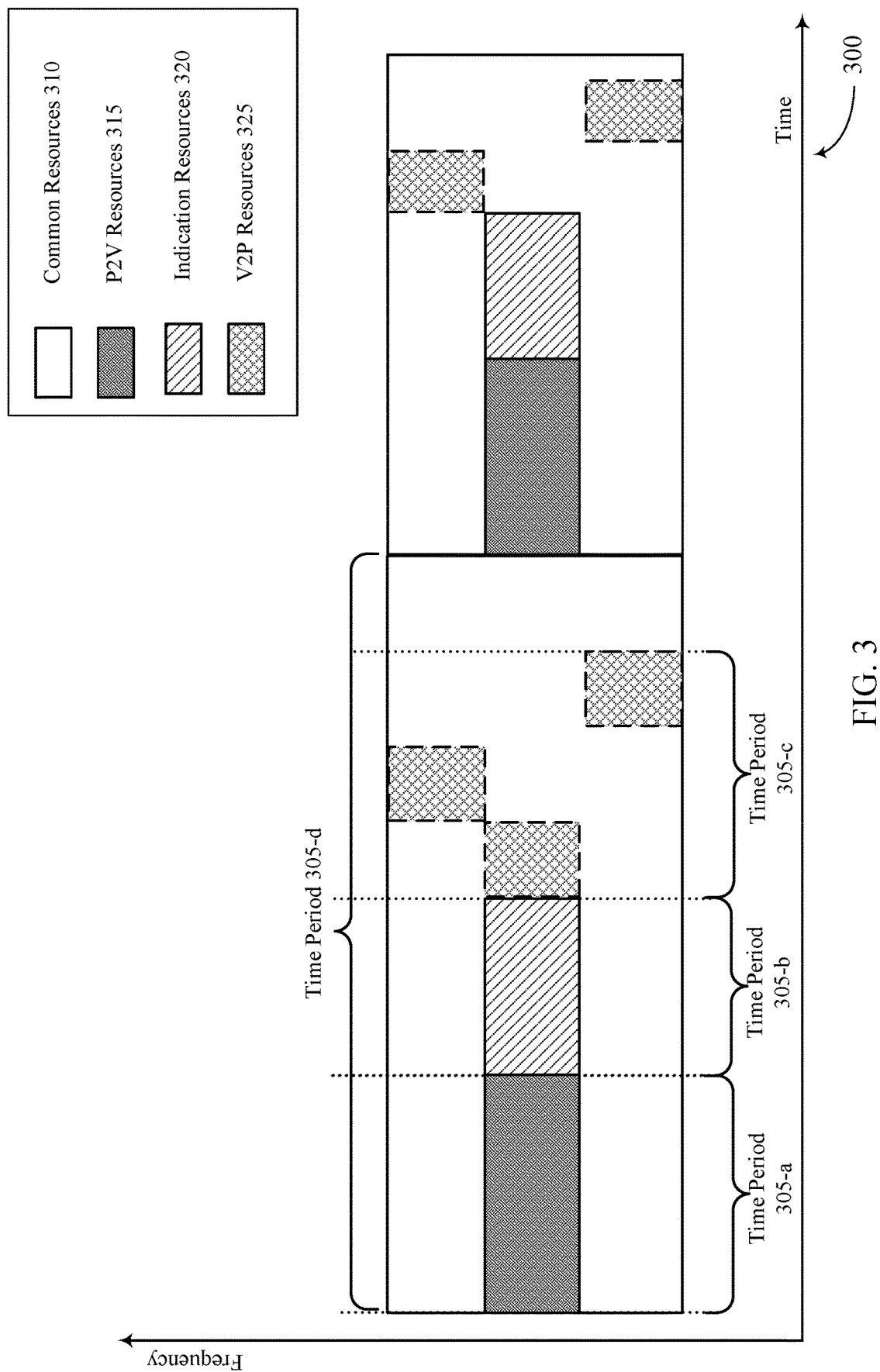
FIG. 3 illustrates an example of a resource scheme that supports sidelink vehicle to VRU techniques for wireless communications systems in accordance with one or more aspects of the present disclosure.

Accordingly, the wireless devices 205 may implement a sidelink channel design as described herein, for example, with reference to FIG. 3. For example, the wireless device 205-a may communicate with other wireless devices 205 using one or more resource pools. As an illustrative example, the wireless device 205-a may be an example of a V-UE and may communicate with other wireless devices 205 (e.g., vehicles, UEs, RSUs, base stations, or the like) using a common resource pool. Additionally or alternatively, the wireless device 205-a may monitor for communications from other wireless devices 205 using a P2V resource pool (e.g., resources allocated for communications from wireless devices 205-b and 205-d associated with VRUs). Additionally or alternatively, the wireless device 205-a may transmit communications to other wireless devices 205 using a V2P resource pool (e.g., resources allocated for communication to wireless devices 205-b and 205-d associated with VRUs). In some examples, the wireless device 205-a may receive data during a first time period (e.g., via the P2V resource pool) and transmit a paging indication to other wireless devices 205 based on the received data. The paging indication may indicate resources (e.g., frequency resources, time resources) associated with the V2P resource pool in a second time period. Such resources may be dynamically configured (e.g., a length of the second time period may vary, the resources for the V2P pool may be allocated to different portions of the common resource pool for different time periods, or the like). Thus, the wireless device 205-a may communicate with other wireless devices 205 relatively efficiently.

Additionally or alternatively, the wireless devices 205 may implement one or more priority schemes. For example, the wireless device 205-a may be configured with a common resource pool of a sidelink channel during a first time period and a P2V resource pool during the first time period. In some examples, the wireless device 205-a may monitor the P2V resource pool for communications from the wireless devices 205-b and 205-d (e.g., P-UEs) or the wireless device 205-a may transmit or receive data with other wireless devices 205 (e.g., V-UEs) via the common resource pool. The wireless device may identify one or more parameters (e.g., rules) for such communications over the sidelink channel. In some examples, the one or more parameters may indicate a time threshold (e.g., a threshold quantity of time resources such as symbols or slots, a threshold percentage of the first time period for monitoring and/or transmitting over a resource pool, or the like). In some examples, the wireless device 205-a may identify a geographic zone ID associated with a geographic area of the wireless communications system 200. In such examples, the one or more parameters may correspond to the geographic zone ID (e.g., the wireless device 205-a may identify the one or more parameters based on the geographic zone ID). In some examples, the wireless device 205-a may calculate a CBR associated with the sidelink channel (e.g., a CBR of the P2V pool). The wireless device 205-a may compare the CBR to a threshold and identify the one or more parameters based on the comparison. In some examples, the wireless device 205-a may receive control signaling indicating a reconfiguration of the one or more parameters (e.g., the wireless device 205-c may transmit an RRC reconfiguration message indicating an updated set of rules).

In some examples, the wireless device 205-a may determine the one or more parameters (e.g., priority rules) based on a zone ID. For example, the wireless device 205-a may identify a geographic zone ID for sidelink communications based on control signaling, a pre-configuration of the wireless device, or the like. As an illustrative example, the zone ID may correspond to the zone 215 for sidelink communications between the wireless devices in the wireless communications system 200. That is, the zone 215 may correspond to an ID and the wireless device 205-a may implement the techniques described herein based on identifying that the wireless device 205-a is in the zone 215. For example, the one or more parameters described herein may vary for different zones 215. As an illustrative example, a first zone (e.g., the zone 215) may not include pedestrians or be associated with a relatively low quantity of pedestrians. In such examples, the wireless device 205-a may be configured with parameters such that the wireless device 205-a may transmit data via common resources for a relatively larger portion of a time period. Additionally or alternatively, a second zone (e.g., the zone 215) may include a relatively large quantity of pedestrians (e.g., a populated intersection). In such examples, the wireless device 205-a may be configured with parameters such that the wireless device 205-a may monitor P2V resources for a relatively large portion of the time period. In some examples, the one or more parameters may be pre-configured for each zone ID. For example, a first zone ID may be configured with a first set of parameters (e.g., rules $R_1$) and the a second zone ID may be configured with a second set of parameters (e.g., rules $R_2$). The set of parameters may include one or more time thresholds as described herein (e.g., a quantity of consecutive instants, a percentage of a time period, or the like).

FIG. 3 illustrates an example of a resource scheme 300 that supports sidelink vehicle to VRU techniques for wireless communications systems in accordance with one or more aspects of the present disclosure. In some examples, the resource scheme 300 may implement aspects of wireless communications systems 100 and 200. For example, the resource scheme 300 may illustrate communications over radio frequency resources between various wireless devices 205 as described with reference to FIG. 2. The resource scheme 300 may illustrate an example sidelink design for a wireless communications system (e.g., a V2P communications system).

The resource scheme 300 may include time periods 305. The time period 305-d may include the time periods 305-a, 305-b, and 305-c (e.g., the time period 305-d may be referred to as a time period "W"). The time period 305-d may include common resources 310, P2V resources 315, indication resources 320, and V2P resources 325. In some examples, one or more resource pools may be FDMed. For example, the common resources 310 may be FDMed with the P2V resources 315 and the V2P resources 325 (e.g., the common resources 310 may be allocated to a different frequency and a same time period 305 as the P2V resources 315 and V2P resources 325).

The common resources 310 may be an example of a resource pool used for communications between UEs over the sidelink channel (e.g., resources allocated for communications between V-UEs). The P2V resources 315 may be an example of a resource pool used for communications from UEs associated with VRUs (e.g., UEs associated with pedestrians, UEs associated with bicycles, or the like) to vehicles. For example, the P2V resources 315 may be a quantity of PRBs (e.g., $f_1$ dedicated PRBs) for the time period 305-a (e.g., $m_1$ slots or symbols) where P-UEs transmit to vehicles. The V2P resources 325 may be an example of a resource pool used for communications from vehicles to UEs associated with VRUs. For example, the V2P resources 325 may be a quantity of PRBs for the time period 305-a (e.g., $m_2$ slots or symbols) where vehicles transmit to P-UEs. The indication resources 320 may be an example of a paging indicator resource pool for communications from vehicles to UEs associated with VRUs. For example, the indication resources 320 may be a quantity of PRBs (e.g., $f_0$ dedicated PRBs) for the time period 305-a (e.g., $m_0$ slots or symbols) where vehicles transmit paging indications to P-UEs.

A wireless device may perform various sidelink communications via the resource pools. For example, the wireless device may be an example of a V-UE and may monitor the P2V resources 315 during the time period 305-a for transmissions from P-UEs (e.g., messages indicating safety information, location information, trajectory information, or the like). Additionally or alternatively, the wireless device may transmit to other wireless devices (e.g., other vehicles) via the common resources 310 during the time period 305-a. In some examples, the wireless device may determine to transmit a paging indication message to another wireless device via the indication resources 320. For example, a V-UE may determine to communicate data to a P-UE based on information received via the P2V resources 315 (e.g., the V-UE may detect that the P-UE is on a collision course with the V-UE). The P-UE may receive the paging indication message during the time period 305-b. In some examples, the paging indication message may indicate that the V-UE is on a collision course with the P-UE (e.g., a warning message, location or trajectory information associated with the V-UE or the P-UE, a command to deviate from a current course or to brake, or the like).

Additionally or alternatively, the paging indication message may indicate one or more V2P resources 325 (e.g., PRBs for communications from a V-UE to a P-UE). For example, the paging indication message may indicate that a V-UE has data to transmit to a P-UE, one or more V2P resources 325 for the P-UE to monitor for the data. In some examples, the duration of the time period 305-c (e.g., a quantity of the $m_2$ slots or symbols corresponding to the V2P resources 325) may be dynamic. For example, in a time period 305 subsequent or prior to the time period 305-d the length of the time period corresponding to the V2P resources 325 may vary (e.g., the time period 305-c may not be dedicated or deterministic). In some examples, the duration of the time period 305-c may be configurable (e.g., the paging indication message may configure one or more wireless devices with a quantity of slots or symbols for monitoring for messages via the V2P resources 325). In some other examples, the duration of the time period 305-c may be pre-configured (e.g., via control signaling, pre-configured at a wireless device, or the like). In some examples, if a wireless device (e.g., a P-UE) does not receive a paging indication via the indication resources during the time period 305-b, the wireless device may determine that all of the resources in the time period 305-c are common resources 310.

A wireless device may operate in accordance with half-duplex operations. For example, the wireless device may transmit data to other wireless devices via the common resources 310 during the time period 305-a. Additionally or alternatively, the wireless device may monitor for data to receive from other wireless devices (e.g., P-UEs) via the P2V resources 315 during the time period 305-a. However, in some cases the wireless device may not support full duplex communications (e.g., receiving signals and transmitting signals simultaneously). For example, the wireless device may transmit data over the common resources 310 over the time period 305-a, and the wireless device may be unable to monitor the P2V resources 315 while transmitting the data. However, such communications may be relatively inefficient or unsafe. For example, if the wireless device refrains from monitoring the P2V resources 315 during the time period 305-a for messages from P-UEs, the wireless device may fail to receive P-UE data (e.g., the wireless device may be unaware of a potential collision). Alternatively, if the wireless device refrains from transmitting via the common resources 310 during the time period 305-a, the wireless device may fail to realize efficient resource utilization or power savings.

Accordingly, the wireless device may implement one or more priority schemes. The wireless device may identify one or more parameters for communications over the sidelink channel (e.g., rules, thresholds, geographic zone IDs, and the like). In some examples, the wireless device may receive control signaling indicating the one or more parameters. For example, another wireless device (e.g., a base station, a UE such as a vehicle, an RSU, or the like) may configure or reconfigure the wireless device with one or more parameters, for example, via one or more RRC reconfiguration messages. Additionally or alternatively, the wireless device may be pre-configured with such parameters. In some examples, the other wireless device may receive an indication of one or more conditions associated with another wireless device. For example, a base station may receive an indication of one or more safety conditions associated with a V-UE (e.g., the V-UE may detect one or more collisions or other safety conditions as described herein and report the detected conditions to the base station). The base station (or another V-UE) may transmit a message indicating the one or more parameters (e.g., one or more time thresholds), such as a control message. The base station may transmit messages (e.g., safety messages) based on one or more conditions satisfying one or more thresholds. For example, the base station may instruct UEs to utilize the V2P pool for a threshold duration as described herein based on a condition (e.g., road conditions, driver conditions, safety or event detection, and the like) satisfying a threshold, which may enhance safety as described herein.

In some examples, the one or more parameters may include one or more time thresholds. For example, the wireless device (e.g., a V-UE) may transmit to other devices (e.g., other V-UEs) for a first portion of the time period 305-a. The wireless device may compare a duration of the first portion to a time threshold and switch from transmitting to monitoring (e.g., listening) based on the threshold being satisfied. For example, if the wireless device has been transmitting over the common resources 310 for more than $N_1$ consecutive instants (e.g., consecutive symbols or slots), then the wireless device may be configured to monitor the P2V resources 315 for a second portion of the time period 305-a. As an illustrative example, the one or more parameters may configure the wireless device to monitor the P2V resources 315 for $N_2$ consecutive instants (e.g., irrespective of the priority of communications over the common resources 310) upon determining that the wireless device has transmitted over the common resources 310 for $N_1$ consecutive instants.

Additionally or alternatively, the time threshold may indicate a consecutive or non-consecutive portion of the time period 305-a to receive communications or transmit communications. For example, the wireless device may be configured to monitor the P2V resources 315 for a percentage of a time period 305 (e.g., x % of the time period 305-a irrespective of the priority of communications over the common resources 310). Additionally or alternatively, the wireless device may be configured to transmit communications via the common resources 310 for a percentage of the time period 305.

In some examples, the wireless device may determine the one or more parameters (e.g., priority rules) based on a zone ID. For example, the wireless device may identify a geographic zone ID for sidelink communications based on control signaling, a pre-configuration of the wireless device, or the like. The wireless device may communicate during the time periods 305 in accordance with a set of parameters corresponding to the identified geographic zone ID (e.g., the one or more parameters may be dynamically varied for different geographic zone IDs). As an illustrative example, a first zone (e.g., zone $Z_1$) may not include pedestrians or be associated with a relatively low quantity of pedestrians. In such examples, the wireless device may be configured with parameters such that the wireless device may transmit data via the common resources 310 for a relatively larger portion of the time period 305-a. Additionally or alternatively, a second zone (e.g., zone $Z_2$) may include a relatively large quantity of pedestrians (e.g., a populated intersection). In such examples, the wireless device may be configured with parameters such that the wireless device may monitor the P2V resources 315 for a relatively large portion of the time period 305-a. In some examples, the one or more parameters may be pre-configured for each zone ID. For example, the first zone ID may be configured with a first set of parameters (e.g., rules $R_1$) and the second zone ID may be configured with a second set of parameters (e.g., rules $R_2$). The set of parameters may include one or more time thresholds as described herein (e.g., a quantity of consecutive instants, a percentage of a time period 305, or the like).

The wireless device may operate in accordance with the identified zone ID. For example, the wireless device may transmit first data at a first time period 305 in accordance with the set of rules corresponding to a first zone ID. The wireless device may move between zones and identify a second zone ID for communications over the sidelink channel. The wireless device may transmit second data at a second time period 305 in accordance with a second set of rules corresponding to the second zone ID.

In some examples, the wireless device may calculate a CBR of the sidelink channel (e.g., a CBR of the P2V resource pool). The CBR may be associated with a quantity of subchannels of the sidelink channel that satisfy a threshold. For example, the wireless device may calculate a received signal strength indicator (RSSI) for a set of subchannels in a last N quantity of P2V resource pool occasions. The wireless device may determine an amount of the set of subchannels that correspond to an RSSI that satisfies (e.g., is greater than or equal to) a threshold RSSI. In some cases, the RSSI threshold may be pre-configured at the wireless device or indicated via control signaling.

The wireless device may adapt a priority between the sidelink communications based on the calculated CBR. For example, the wireless device may adjust a priority associated with transmitting data over the common resources 310 during the time period 305-a, a priority associated with monitoring the P2V resources 315 during the time period 305-a, or both. As an illustrative example, the wireless device may compare the CBR (e.g., the quantity of subchannels) to a threshold (e.g., a threshold associated with the P2V resources 315). In some examples, the wireless device may determine that the CBR satisfies the threshold (e.g., is greater than or equal to the threshold). In such examples, the wireless device may perform reception via the P2V resources 315 for a portion of the time period 305-a in accordance with one or more parameters (e.g., the wireless device may monitor the P2V resources 315 for $x_1$% of a preconfigured time period 305). In some other examples, the wireless device may determine that the CBR fails to satisfy the threshold (e.g., is less than or equal to the threshold). In such examples, the wireless device may perform transmission via the common resources 310 for a portion of the time period 305-a in accordance with one or more parameters (e.g., the wireless device may transmit data via the common resources 310 for $x_2$% of a preconfigured time period 305).

Figure 4:
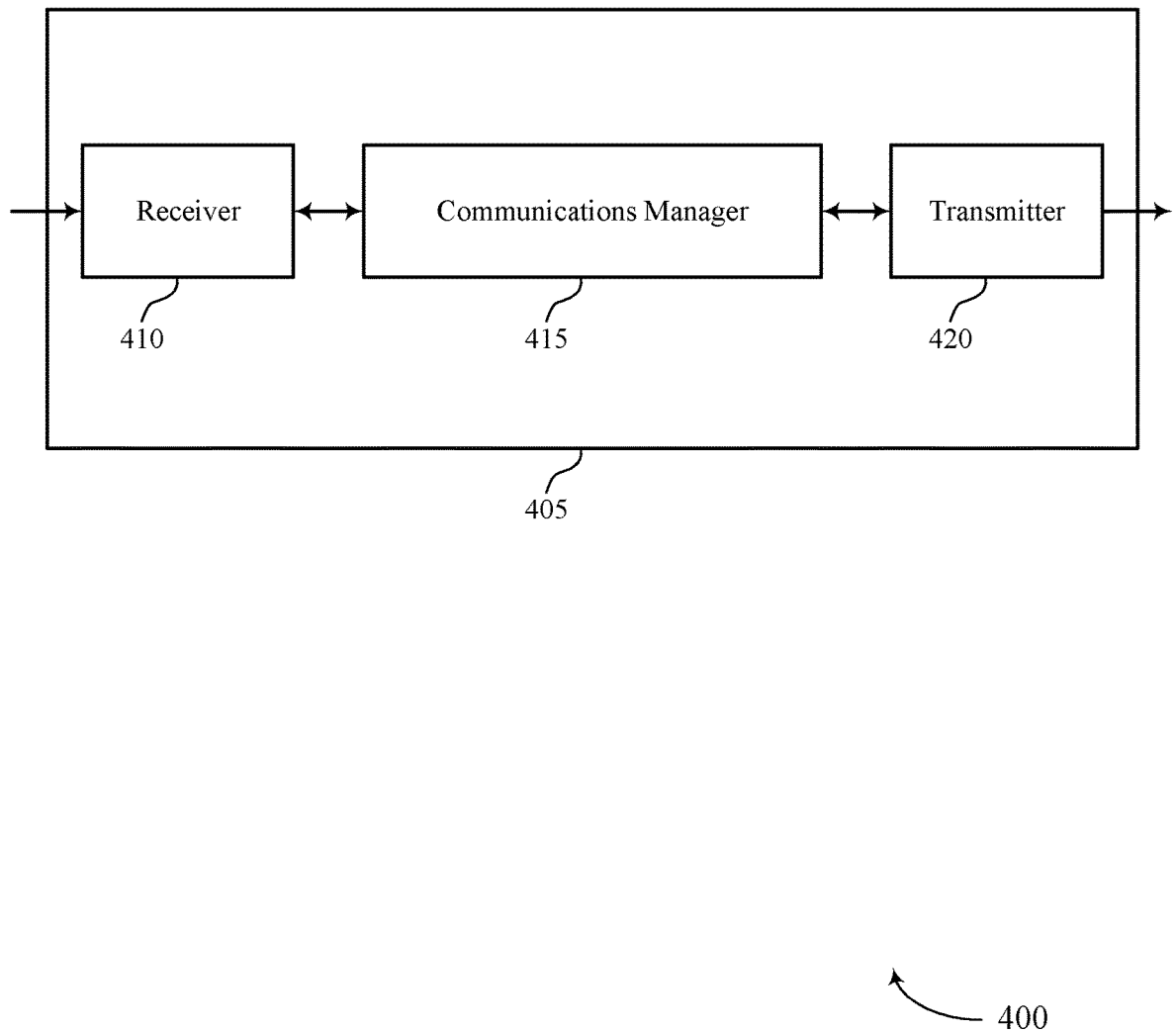
FIGS. 4 and 5 show block diagrams of devices that support sidelink vehicle to VRU techniques for wireless communications systems in accordance with one or more aspects of the present disclosure.

FIG. 4 shows a block diagram 400 of a device 405 that supports sidelink vehicle to VRU techniques for wireless communications systems in accordance with one or more aspects of the present disclosure. The device 405 may be an example of aspects of a wireless device (e.g., a UE 115) as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to sidelink V2P techniques for wireless communications systems). Information may be passed on to other components of the device 405. The receiver 410 may be an example of aspects of the transceiver 720 described with reference to FIG. 7. The receiver 410 may utilize a single antenna or a set of antennas.

The communications manager 415 may identify one or more parameters for communications over a sidelink channel during a first time period, transmit data over a first resource pool of the sidelink channel during a first portion of the first time period based on the one or more parameters, the first resource pool including resources for communications between the first wireless device and a second wireless device, and monitor a second resource pool during a second portion of the first time period based on a time threshold of the one or more parameters, the second resource pool including resources for communications between the first wireless device and a third wireless device. The communications manager 415 may be an example of aspects of the communications manager 710 described herein.

The communications manager 415 may receive an indication of one or more parameters for communications over a sidelink channel during a first time period, the one or more parameters including a time threshold for a second resource pool, transmit data over a first resource pool of the sidelink channel during a first portion of the first time period based on the one or more parameters, the first resource pool including resources for communications between the first wireless device and a second wireless device, and monitor the second resource pool during a second portion of the first time period for the time threshold, the second resource pool including resources for communications between the first wireless device and a third wireless device.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 415 may implement one or more priority schemes and/or sidelink communication techniques as described herein, which may result in more efficient communications, power savings, enhanced safety, and the like, of a wireless communications systems.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

By including or configuring the communications manager 415 in accordance with examples as described herein, the device 405 (e.g., a processor controlling or otherwise coupled to the receiver 410, the transmitter 420, the communications manager 415, or a combination thereof) may support techniques for more efficient utilization of communication resources, and the like.

Figure 5:
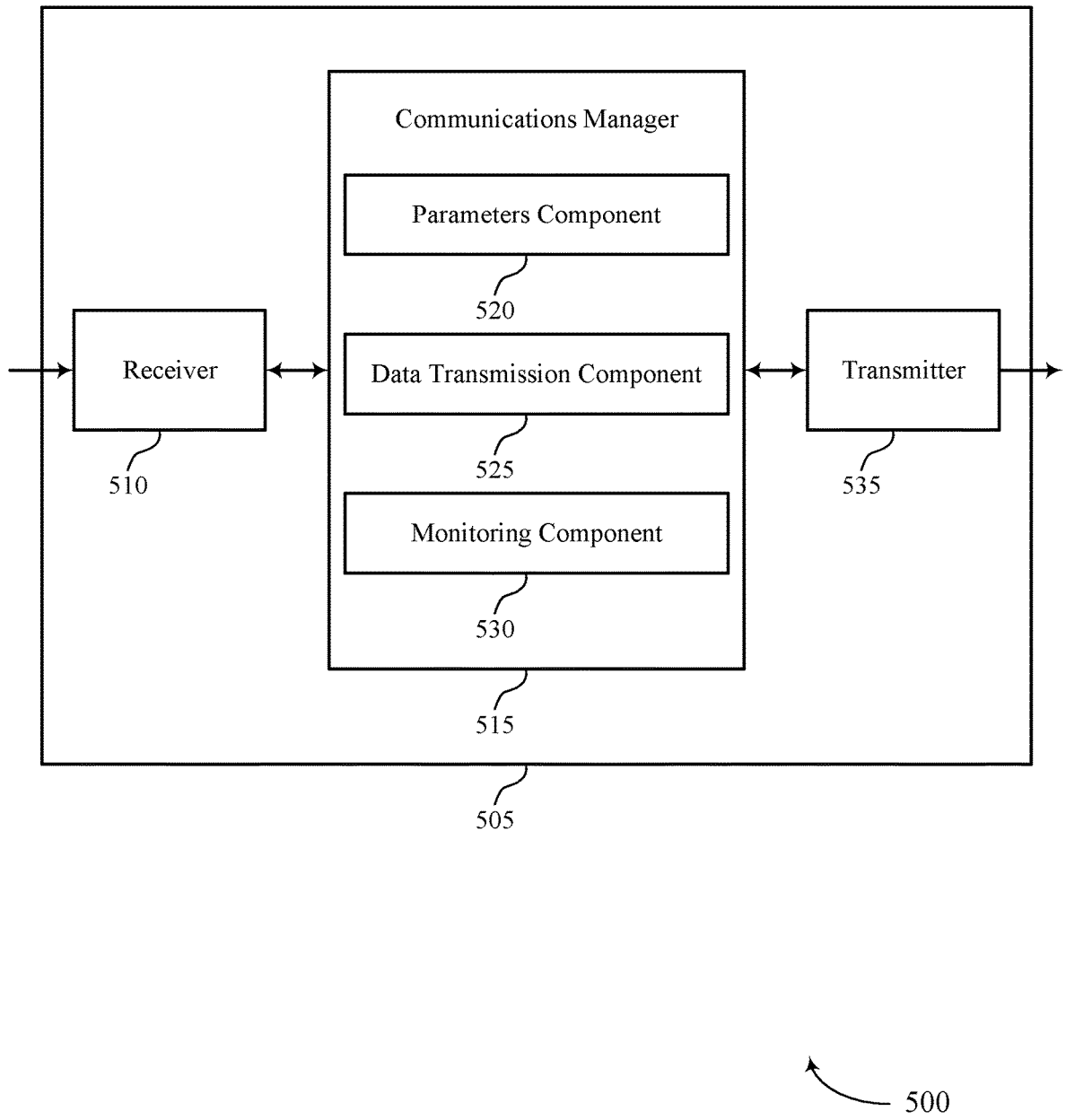

FIG. 5 shows a block diagram 500 of a device 505 that supports sidelink vehicle to VRU techniques for wireless communications systems in accordance with one or more aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to sidelink V2P techniques for wireless communications systems). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a parameters component 520, a data transmission component 525, and a monitoring component 530. The communications manager 515 may be an example of aspects of the communications manager 710 described herein.

The parameters component 520 may identify one or more parameters for communications over a sidelink channel during a first time period. In some examples, the parameters component 520 may receive an indication of one or more parameters for communications over a sidelink channel during a first time period, the one or more parameters including a time threshold for a second resource pool.

The data transmission component 525 may transmit data over a first resource pool of the sidelink channel during a first portion of the first time period based on the one or more parameters, the first resource pool including resources for communications between the first wireless device and a second wireless device.

The monitoring component 530 may monitor a second resource pool during a second portion of the first time period based on a time threshold of the one or more parameters, the second resource pool including resources for communications between the first wireless device and a third wireless device. In some examples, the monitoring component 530 may monitor the second resource pool during a second portion of the first time period for the time threshold, the second resource pool including resources for communications between the first wireless device and a third wireless device.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
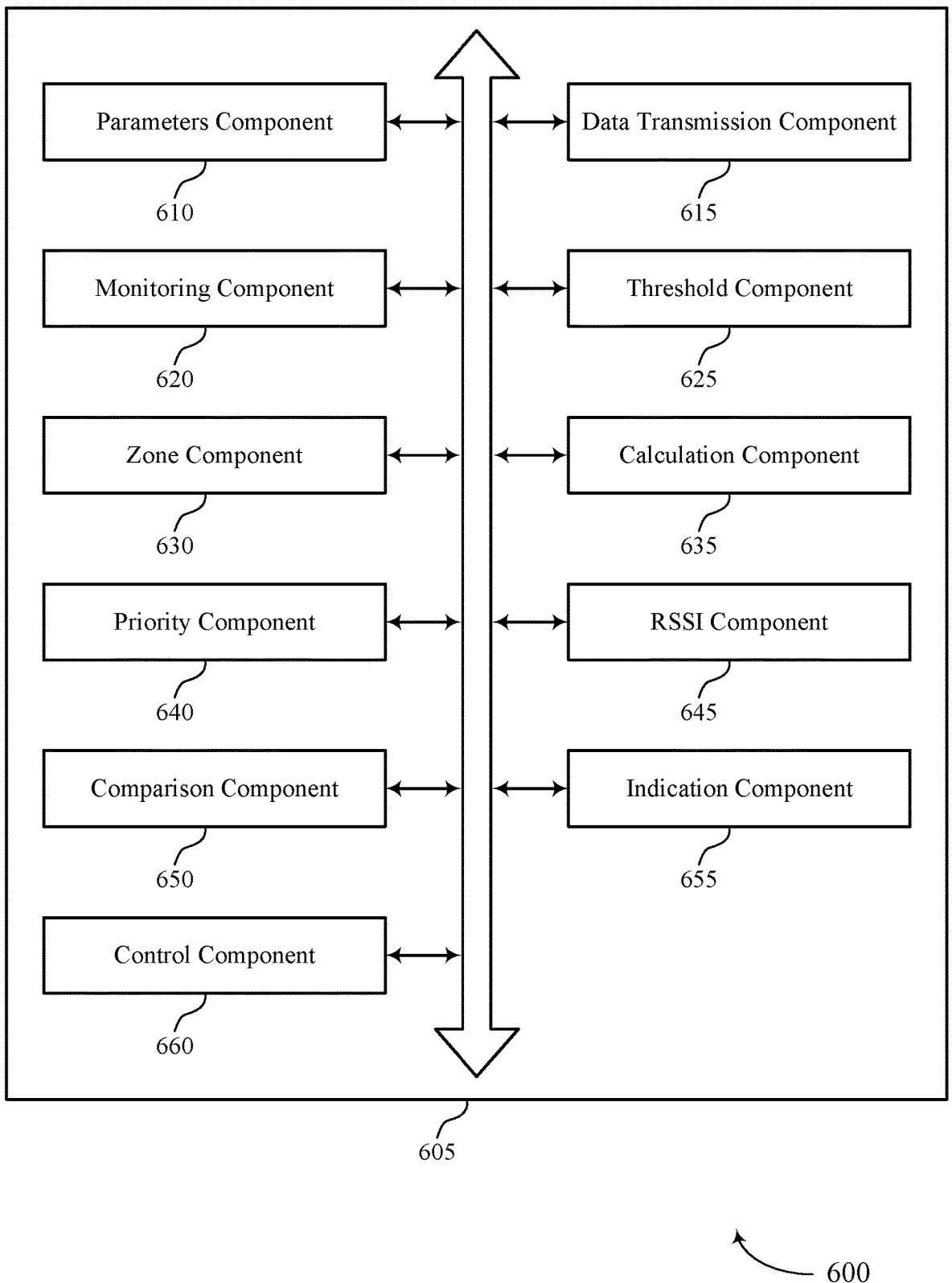
FIG. 6 shows a block diagram of a communications manager that supports sidelink vehicle to VRU techniques for wireless communications systems in accordance with one or more aspects of the present disclosure.

FIG. 6 shows a block diagram 600 of a communications manager 605 that supports sidelink vehicle to VRU techniques for wireless communications systems in accordance with one or more aspects of the present disclosure. The communications manager 605 may be an example of aspects of a communications manager 415, a communications manager 515, or a communications manager 710 described herein. The communications manager 605 may include a parameters component 610, a data transmission component 615, a monitoring component 620, a threshold component 625, a zone component 630, a calculation component 635, a priority component 640, a RSSI component 645, a comparison component 650, an indication component 655, and a control component 660. Each of these modules may communicate, directly or indirectly, with one another (e.g., via one or more buses).

The parameters component 610 may identify one or more parameters for communications over a sidelink channel during a first time period. In some examples, the parameters component 610 may receive an indication of one or more parameters for communications over a sidelink channel during a first time period, the one or more parameters including a time threshold for a second resource pool. In some examples, the parameters component 610 may identify a set of parameters for communications over the sidelink channel during the second time period based on the second geographic zone identifier. In some cases, the first wireless device includes a V-UE, the second wireless device includes a second V-UE, the third wireless device includes a UE associated with a VRU, or any combination thereof. In some cases, the first wireless device includes a P-UE. In some cases, the second resource pool includes a common resource pool for communications between V-UEs and the first resource pool includes resources for communications between V-UEs and UEs associated with one or more VRU.

The data transmission component 615 may transmit data over a first resource pool of the sidelink channel during a first portion of the first time period based on the one or more parameters, the first resource pool including resources for communications between the first wireless device and a second wireless device. In some examples, the data transmission component 615 may transmit second data over the first resource pool of the sidelink channel during a first portion of the second time period based on the set of parameters.

The monitoring component 620 may monitor a second resource pool during a second portion of the first time period based on a time threshold of the one or more parameters, the second resource pool including resources for communications between the first wireless device and a third wireless device. In some examples, the monitoring component 620 may monitor the second resource pool during a second portion of the first time period for the time threshold, the second resource pool including resources for communications between the first wireless device and a third wireless device. In some examples, the monitoring component 620 may monitor the second resource pool during a second portion of the second time period based on the set of parameters.

The threshold component 625 may determine that the first portion of the first time period satisfies a threshold quantity of consecutive symbols associated with transmitting the data over the first resource pool. In some examples, identifying a second quantity of consecutive symbols based on the time threshold of the one or more parameters, where monitoring the second resource pool during the second portion of the first time period includes monitoring the second resource pool during the second quantity of consecutive symbols. In some examples, the threshold component 625 may determine that the second portion of the first time period satisfies the time threshold associated with monitoring the second resource pool, the time threshold including a percentage of the first time period.

The zone component 630 may identify a geographic zone identifier corresponding to the communications over the sidelink channel, where identifying the one or more parameters is based on the geographic zone identifier. In some examples, the zone component 630 may identify a second geographic zone identifier at a second time period subsequent the first time period. In some cases, the one or more parameters indicate a duration of the first portion of the first time period, a duration of the second portion of the first time period, or both.

The calculation component 635 may calculate a CBR of the second resource pool.

The priority component 640 may adapt a priority associated with transmitting the data over the first resource pool, a priority associated with monitoring the second resource pool, or both based on the calculated CBR. In some examples, the priority component 640 may determine that the CBR fails to satisfy the threshold based on comparing the CBR to the threshold. In some examples, the priority component 640 may determine that the first portion of the first time period satisfies a second time threshold associated with transmitting the data over the first resource pool, the second time threshold including a percentage of the first time period.

In some examples, the priority component 640 may determine that the CBR satisfies the threshold based on comparing the CBR to the threshold. In some examples, the priority component 640 may determine that the second portion of the first time period satisfies the time threshold associated with monitoring the second resource pool, the time threshold including a percentage of the first time period.

The RSSI component 645 may determine, for one or more occasions prior to the first time period, a quantity of sub-channels with a RSSI that satisfies a configured threshold.

The comparison component 650 may compare the CBR to a threshold, where adapting the priority associated with transmitting the data over the first resource pool, the priority associated with monitoring the second resource pool, or both is based on the comparison.

The indication component 655 may transmit, during a second time period, a paging indication to the third wireless device. In some examples, the indication component 655 may communicate with the third wireless device over a third resource pool during a third time period based on transmitting the paging indication, the third resource pool including resources for communications from the first wireless device to the third wireless device. In some cases, the paging indication indicates a duration of the third time period, one or more resources during the third time period allocated for communications between the first wireless device and the third wireless device, or both. In some cases, the first resource pool, the second resource pool, and the third resource pool are frequency division multiplexed during the first time period, the second time period, and the third time period.

The control component 660 may receive a control message indicating the one or more parameters from a base station, a roadside unit, or both. In some cases, the control message includes a RRC reconfiguration message.

Figure 7:
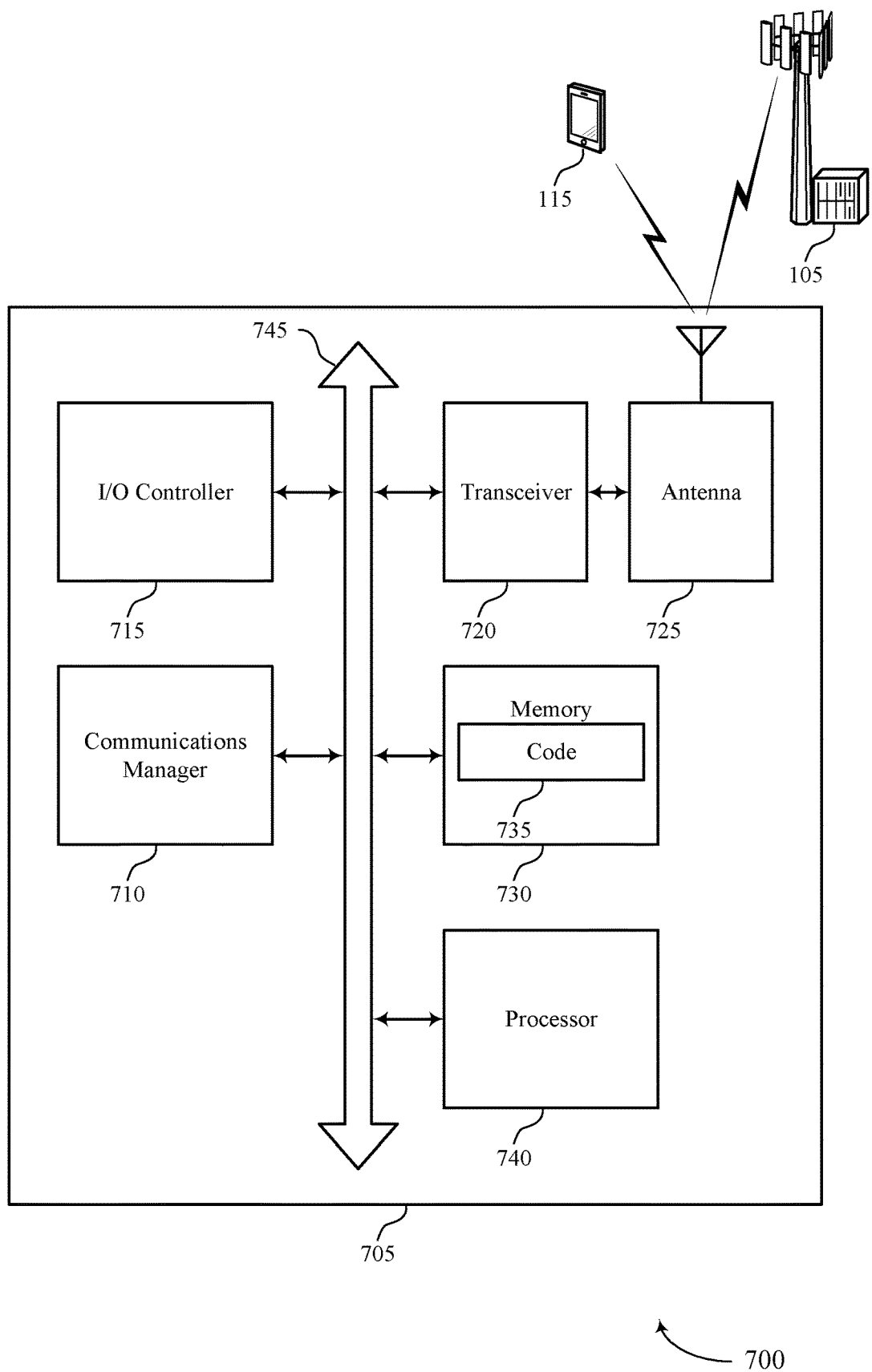
FIG. 7 shows a diagram of a system including a device that supports sidelink vehicle to VRU techniques for wireless communications systems in accordance with one or more aspects of the present disclosure.

FIG. 7 shows a diagram of a system 700 including a device 705 that supports sidelink vehicle to VRU techniques for wireless communications systems in accordance with one or more aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify one or more parameters for communications over a sidelink channel during a first time period, transmit data over a first resource pool of the sidelink channel during a first portion of the first time period based on the one or more parameters, the first resource pool including resources for communications between the first wireless device and a second wireless device, and monitor a second resource pool during a second portion of the first time period based on a time threshold of the one or more parameters, the second resource pool including resources for communications between the first wireless device and a third wireless device. In some examples, the communications manager 710 may receive an indication of one or more parameters for communications over a sidelink channel during a first time period, the one or more parameters including a time threshold for a second resource pool, transmit data over a first resource pool of the sidelink channel during a first portion of the first time period based on the one or more parameters, the first resource pool including resources for communications between the first wireless device and a second wireless device, and monitor the second resource pool during a second portion of the first time period for the time threshold, the second resource pool including resources for communications between the first wireless device and a third wireless device.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. In some examples, the processor 740 may be configured to execute computer-readable instructions stored in a memory (e.g., the memory 730) to cause the device 705 to perform various functions (e.g., functions or tasks supporting sidelink V2P techniques for wireless communications systems).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

By including or configuring the communications manager 710 in accordance with examples as described herein, the device 705 may support techniques for communicating with other UEs (e.g., safety information, collision warnings, and the like) relatively efficiently, resulting in enhanced communications and safer systems.

Figure 8:
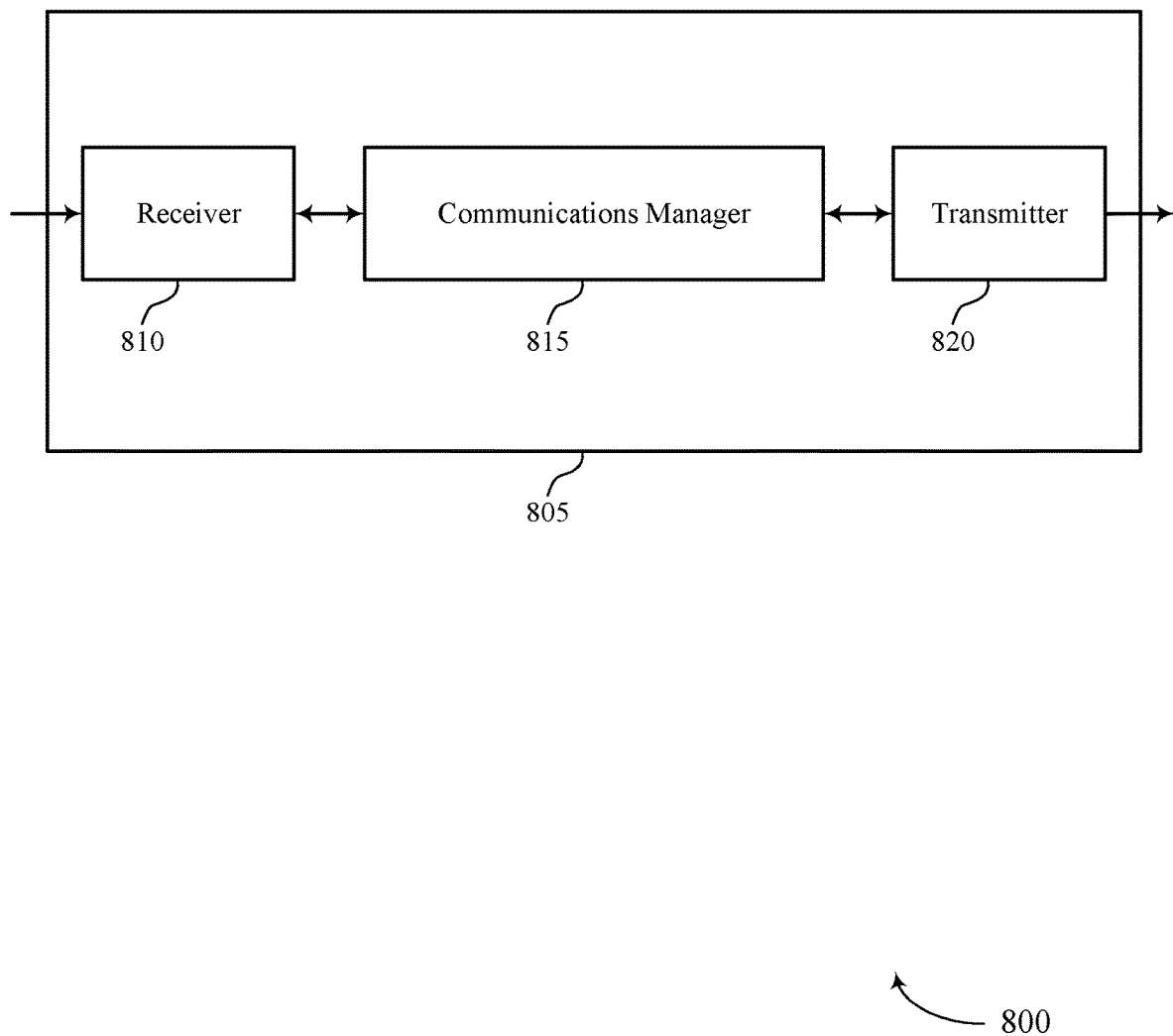
FIGS. 8 and 9 show block diagrams of devices that support sidelink vehicle to VRU techniques for wireless communications systems in accordance with one or more aspects of the present disclosure.

FIG. 8 shows a block diagram 800 of a device 805 that supports sidelink vehicle to VRU techniques for wireless communications systems in accordance with one or more aspects of the present disclosure. The device 805 may be an example of aspects of an RSU or a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to sidelink V2P techniques for wireless communications systems). Information may be passed on to other components of the device 805. The receiver 810 may be an example of aspects of the transceiver 1020 described with reference to FIG. 10. The receiver 810 may utilize a single antenna or a set of antennas.

The communications manager 815 may identify one or more parameters for communications of a second wireless device over a sidelink channel during a first time period and transmit a control message indicating the one or more parameters to the second wireless device. The communications manager 815 may be an example of aspects of the communications manager 1010 described herein.

Additionally or alternatively, the communications manager 815 may receive an indication of one or more conditions associated with a second wireless device, the one or more conditions corresponding to communications of the second wireless device over a sidelink channel, transmit a first message indicating one or more parameters for communications of the second wireless device over the sidelink channel during a first time period, the one or more parameters based on the one or more conditions associated with the second wireless device, and transmit a second message based on a condition of the one or more conditions satisfying a threshold.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1020 described with reference to FIG. 10. The transmitter 820 may utilize a single antenna or a set of antennas.

By including or configuring the communications manager 815 in accordance with examples as described herein, the device 805 (e.g., a processor controlling or otherwise coupled to the receiver 810, the transmitter 820, the communications manager 815, or a combination thereof) may support techniques for more efficient utilization of communication resources, and the like.

Figure 9:
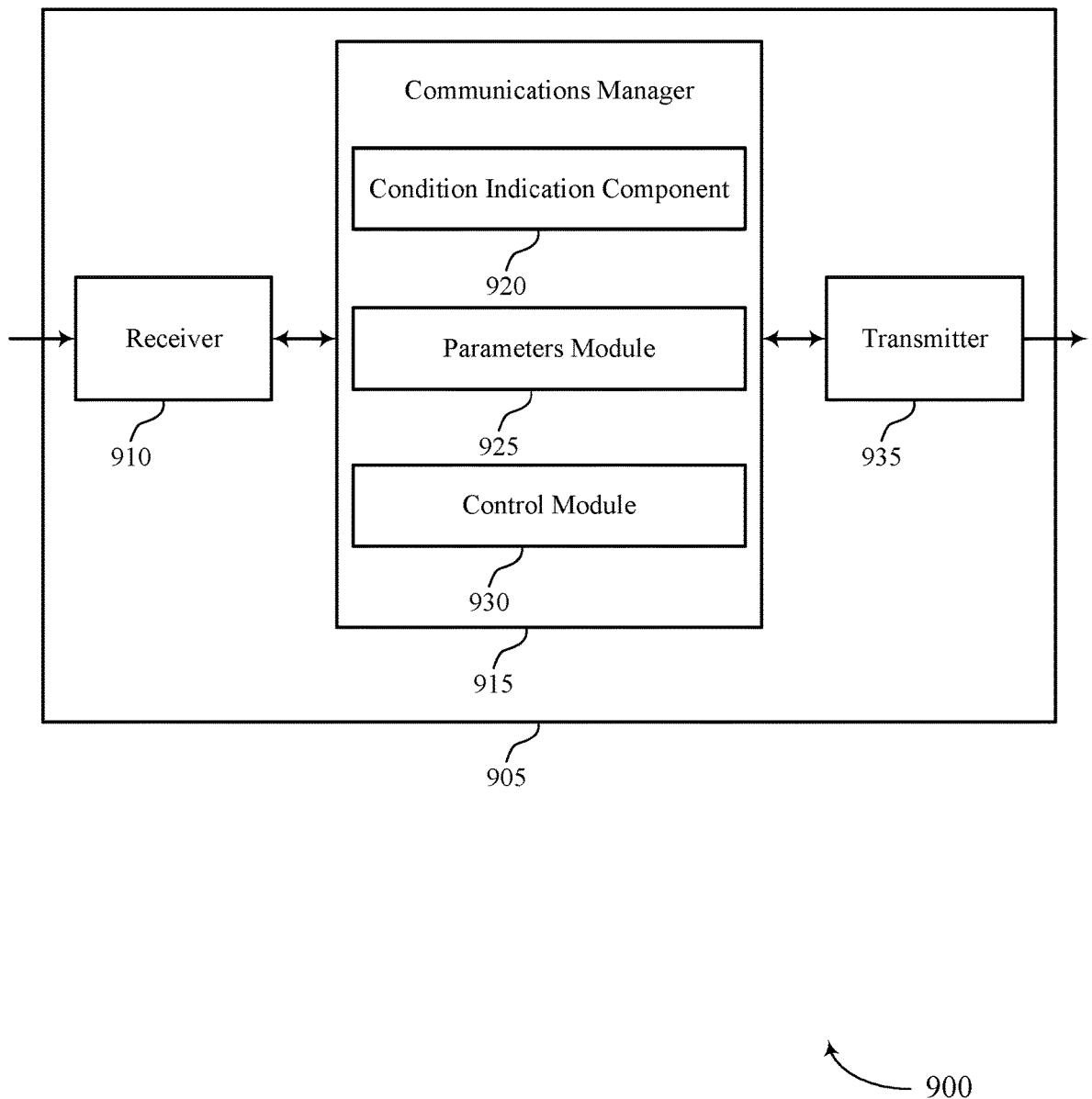

FIG. 9 shows a block diagram 900 of a device 905 that supports sidelink vehicle to VRU techniques for wireless communications systems in accordance with one or more aspects of the present disclosure. The device 905 may be an example of aspects of a device 805, an RSU, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to sidelink V2P techniques for wireless communications systems). Information may be passed on to other components of the device 905. The receiver 910 may be an example of aspects of the transceiver 1020 described with reference to FIG. 10. The receiver 910 may utilize a single antenna or a set of antennas.

The communications manager 915 may be an example of aspects of the communications manager 815 as described herein. The communications manager 915 may include a condition indication component 920, a parameters module 925 and a control module 930. The communications manager 915 may be an example of aspects of the communications manager 1010 described herein.

The condition indication component 920 may receive an indication of one or more conditions associated with a second wireless device, the one or more conditions corresponding to communications of the second wireless device over a sidelink channel. In some examples, the second wireless device may include a V-UE.

The parameters module 925 may identify one or more parameters for communications of a second wireless device over a sidelink channel during a first time period. Additionally or alternatively, the parameters module 925 may transmit a first message indicating one or more parameters for communications of the second wireless device over the sidelink channel during a first time period, the one or more parameters based on the one or more conditions associated with the second wireless device. In some examples, the parameters module 925 may identify a set of parameters different than the one or more parameters, the set of parameters corresponding to communications of the second wireless device over the sidelink channel during a second time period. In some cases, transmitting the first message includes transmitting an RRC reconfiguration message indicating the one or more parameters.

The control module 930 may transmit a control message indicating the one or more parameters to the second wireless device. Additionally or alternatively, the control module 930 may transmit a second message based on a condition of the one or more conditions satisfying a threshold. In some examples, the control module 930 may transmit a third message indicating the set of parameters to the second wireless device. In some cases, the condition includes a safety condition and the threshold includes a safety threshold. In some cases, the second message includes safety information.

The transmitter 935 may transmit signals generated by other components of the device 905. In some examples, the transmitter 935 may be collocated with a receiver 910 in a transceiver module. For example, the transmitter 935 may be an example of aspects of the transceiver 1020 described with reference to FIG. 10. The transmitter 935 may utilize a single antenna or a set of antennas.

Figure 10:
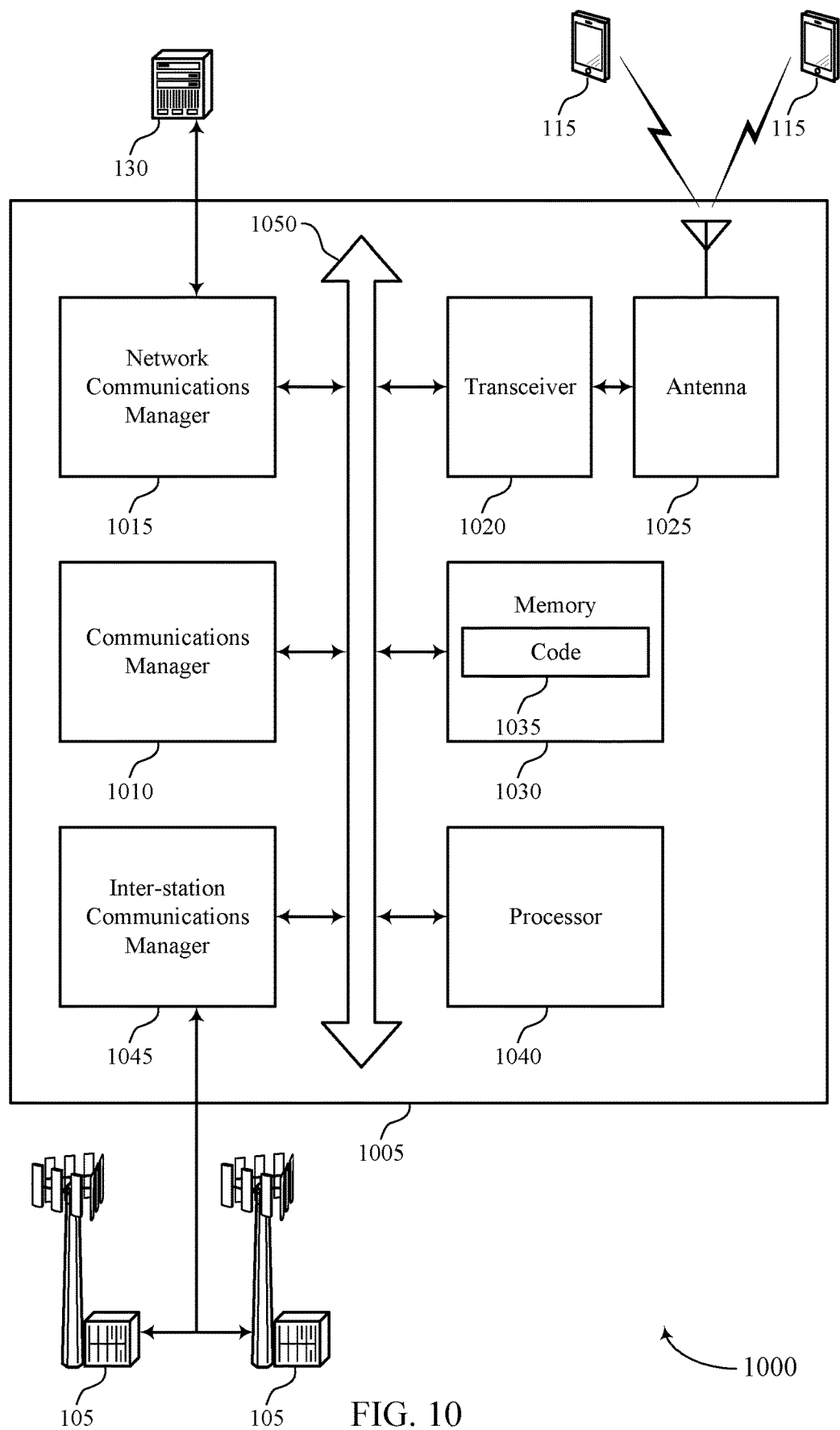
FIG. 10 shows a diagram of a system including a device that supports sidelink vehicle to VRU techniques for wireless communications systems in accordance with one or more aspects of the present disclosure.

FIG. 10 shows a diagram of a system 1000 including a device 1005 that supports sidelink vehicle to VRU techniques for wireless communications systems in accordance with one or more aspects of the present disclosure. The device 1005 may be an example of or include the components of device 805, device 905, an RSU, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1050).

The communications manager 1010 may identify one or more parameters for communications of a second wireless device over a sidelink channel during a first time period and transmit a control message indicating the one or more parameters to the second wireless device.

Additionally or alternatively, the communications manager 1010 may receive an indication of one or more conditions associated with a second wireless device, the one or more conditions corresponding to communications of the second wireless device over a sidelink channel, transmit a first message indicating one or more parameters for communications of the second wireless device over the sidelink channel during a first time period, the one or more parameters based on the one or more conditions associated with the second wireless device, and transmit a second message based on a condition of the one or more conditions satisfying a threshold.

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some cases, a memory controller may be integrated into processor 1040. In some examples, the processor 1040 may be configured to execute computer-readable instructions stored in a memory (e.g., the memory 1030) to cause the device 1005 to perform various functions (e.g., functions or tasks supporting sidelink V2P techniques for wireless communications systems).

The inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

By including or configuring the communications manager 1020 in accordance with examples as described herein, the device 1005 may support techniques for communicating with other UEs (e.g., safety information, collision warnings, and the like) relatively efficiently, resulting in enhanced communications and safer systems.

Figure 11:
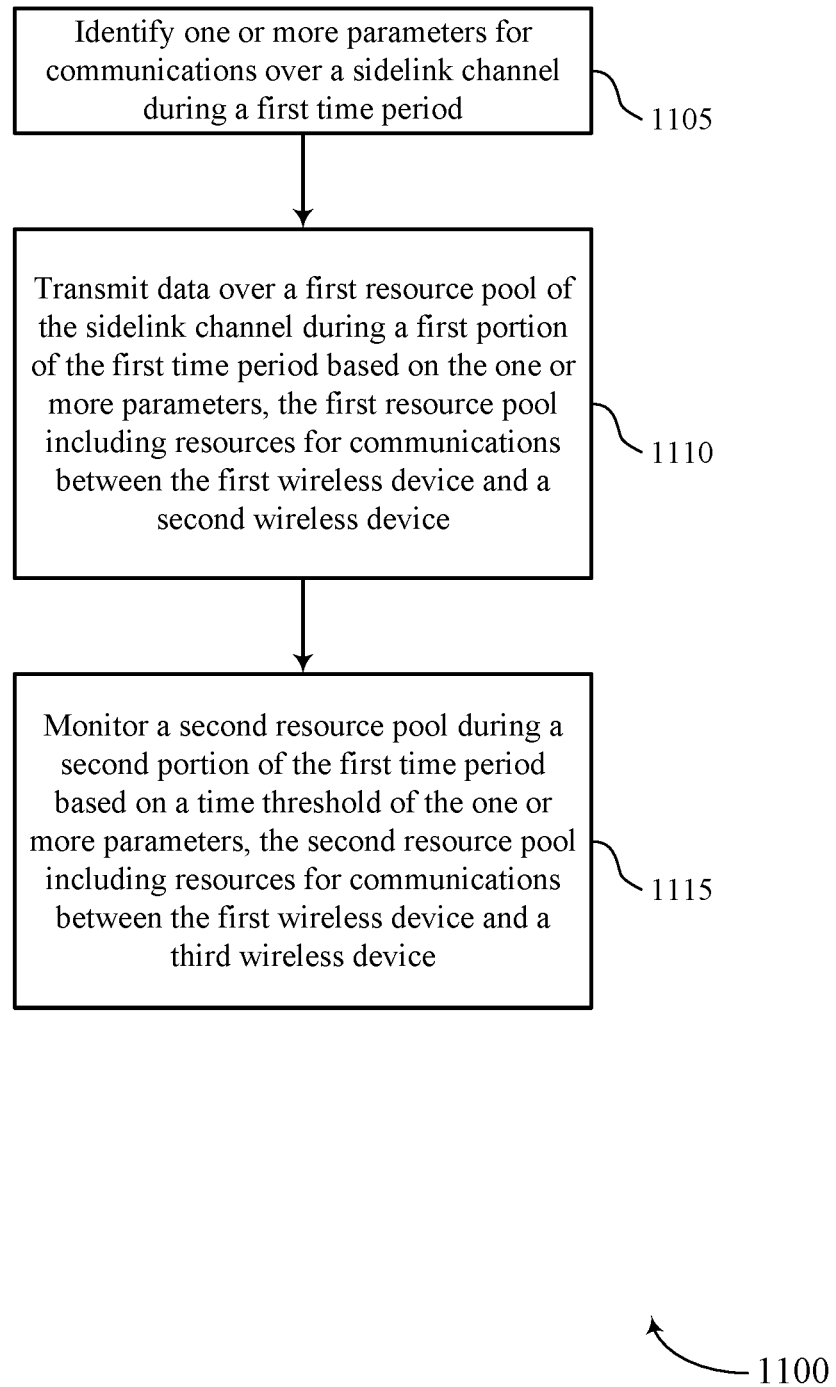
FIGS. 11 through 16 show flowcharts illustrating methods that support sidelink vehicle to VRU techniques for wireless communications systems in accordance with one or more aspects of the present disclosure.

FIG. 11 shows a flowchart illustrating a method 1100 that supports sidelink vehicle to VRU techniques for wireless communications systems in accordance with one or more aspects of the present disclosure. The operations of method 1100 may be implemented by a first wireless device (e.g., a UE 115) or its components as described herein. For example, the operations of method 1100 may be performed by a communications manager as described with reference to FIGS. 4 through 7. In some examples, a first wireless device may execute a set of instructions to control the functional elements of the first wireless device to perform the functions described below. Additionally or alternatively, a first wireless device may perform aspects of the functions described below using special-purpose hardware.

At 1105, the first wireless device may identify one or more parameters for communications over a sidelink channel during a first time period. The operations of 1105 may be performed according to the methods described herein. In some examples, aspects of the operations of 1105 may be performed by a parameters component as described with reference to FIGS. 4 through 7.

At 1110, the first wireless device may transmit data over a first resource pool of the sidelink channel during a first portion of the first time period based on the one or more parameters, the first resource pool including resources for communications between the first wireless device and a second wireless device. The operations of 1110 may be performed according to the methods described herein. In some examples, aspects of the operations of 1110 may be performed by a data transmission component as described with reference to FIGS. 4 through 7.

At 1115, the first wireless device may monitor a second resource pool during a second portion of the first time period based on a time threshold of the one or more parameters, the second resource pool including resources for communications between the first wireless device and a third wireless device. The operations of 1115 may be performed according to the methods described herein. In some examples, aspects of the operations of 1115 may be performed by a monitoring component as described with reference to FIGS. 4 through 7.

Figure 12:
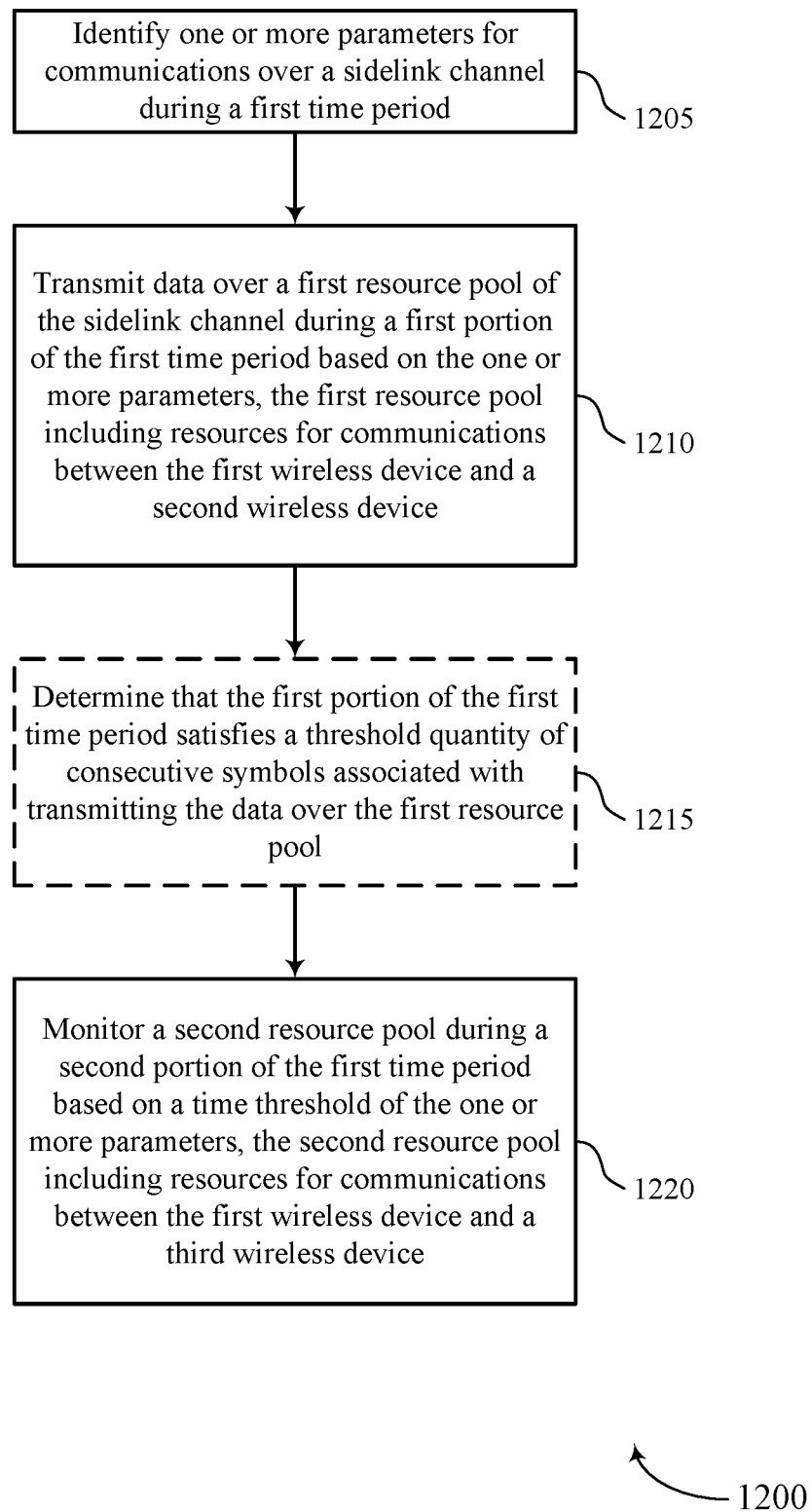

FIG. 12 shows a flowchart illustrating a method 1200 that supports sidelink vehicle to VRU techniques for wireless communications systems in accordance with one or more aspects of the present disclosure. The operations of method 1200 may be implemented by a first wireless device (e.g., a UE 115) or its components as described herein. For example, the operations of method 1200 may be performed by a communications manager as described with reference to FIGS. 4 through 7. In some examples, a first wireless device may execute a set of instructions to control the functional elements of the first wireless device to perform the functions described below. Additionally or alternatively, a first wireless device may perform aspects of the functions described below using special-purpose hardware.

At 1205, the first wireless device may identify one or more parameters for communications over a sidelink channel during a first time period. The operations of 1205 may be performed according to the methods described herein. In some examples, aspects of the operations of 1205 may be performed by a parameters component as described with reference to FIGS. 4 through 7.

At 1210, the first wireless device may transmit data over a first resource pool of the sidelink channel during a first portion of the first time period based on the one or more parameters, the first resource pool including resources for communications between the first wireless device and a second wireless device. The operations of 1210 may be performed according to the methods described herein. In some examples, aspects of the operations of 1210 may be performed by a data transmission component as described with reference to FIGS. 4 through 7.

At 1215, the first wireless device may determine that the first portion of the first time period satisfies a threshold quantity of consecutive symbols associated with transmitting the data over the first resource pool. The operations of 1215 may be performed according to the methods described herein. In some examples, aspects of the operations of 1215 may be performed by a threshold component as described with reference to FIGS. 4 through 7.

At 1220, the first wireless device may monitor a second resource pool during a second portion of the first time period based on a time threshold of the one or more parameters, the second resource pool including resources for communications between the first wireless device and a third wireless device. The operations of 1220 may be performed according to the methods described herein. In some examples, aspects of the operations of 1220 may be performed by a monitoring component as described with reference to FIGS. 4 through 7.

Figure 13:
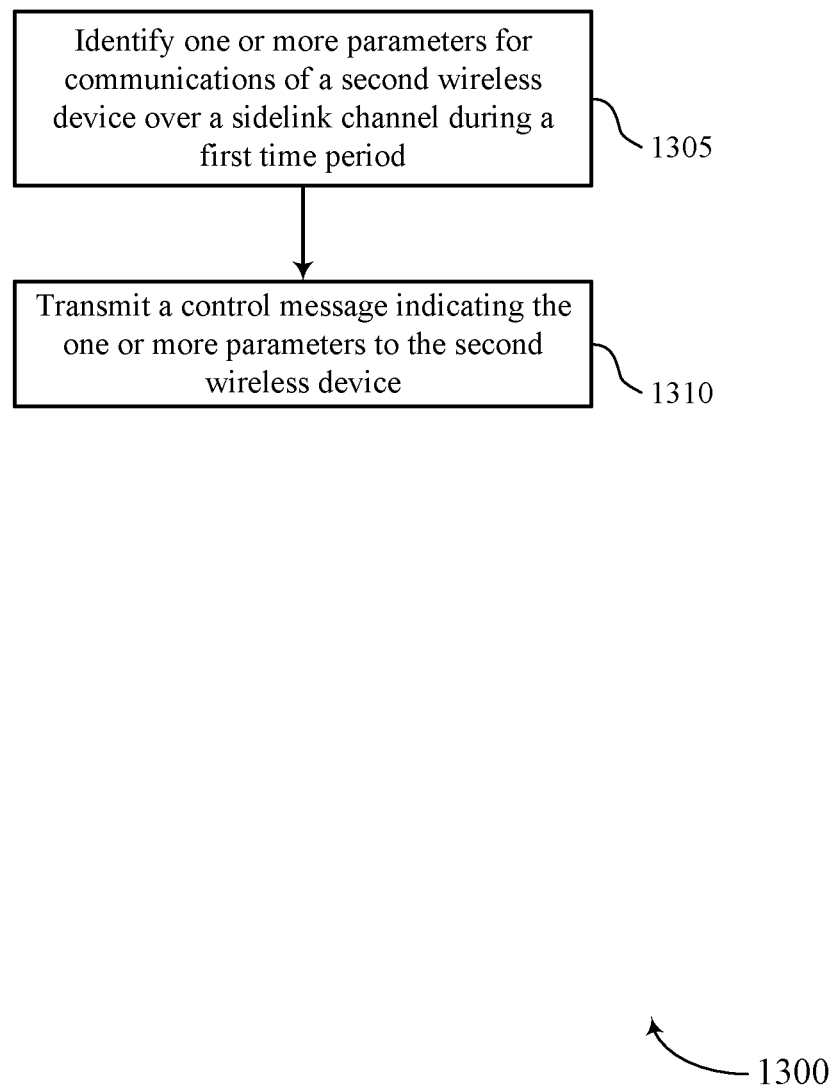

FIG. 13 shows a flowchart illustrating a method 1300 that supports sidelink vehicle to VRU techniques for wireless communications systems in accordance with one or more aspects of the present disclosure. The operations of method 1300 may be implemented by a first wireless device (e.g., an RSU or a base station 105) or its components as described herein. For example, the operations of method 1300 may be performed by a communications manager as described with reference to FIGS. 8 through 10. In some examples, a first wireless device may execute a set of instructions to control the functional elements of the first wireless device to perform the functions described below. Additionally or alternatively, a first wireless device may perform aspects of the functions described below using special-purpose hardware.

At 1305, the first wireless device may identify one or more parameters for communications of a second wireless device over a sidelink channel during a first time period. The operations of 1305 may be performed according to the methods described herein. In some examples, aspects of the operations of 1305 may be performed by a parameters module as described with reference to FIGS. 8 through 10.

At 1310, the first wireless device may transmit a control message indicating the one or more parameters to the second wireless device. The operations of 1310 may be performed according to the methods described herein. In some examples, aspects of the operations of 1310 may be performed by a control module as described with reference to FIGS. 8 through 10.

Figure 14:
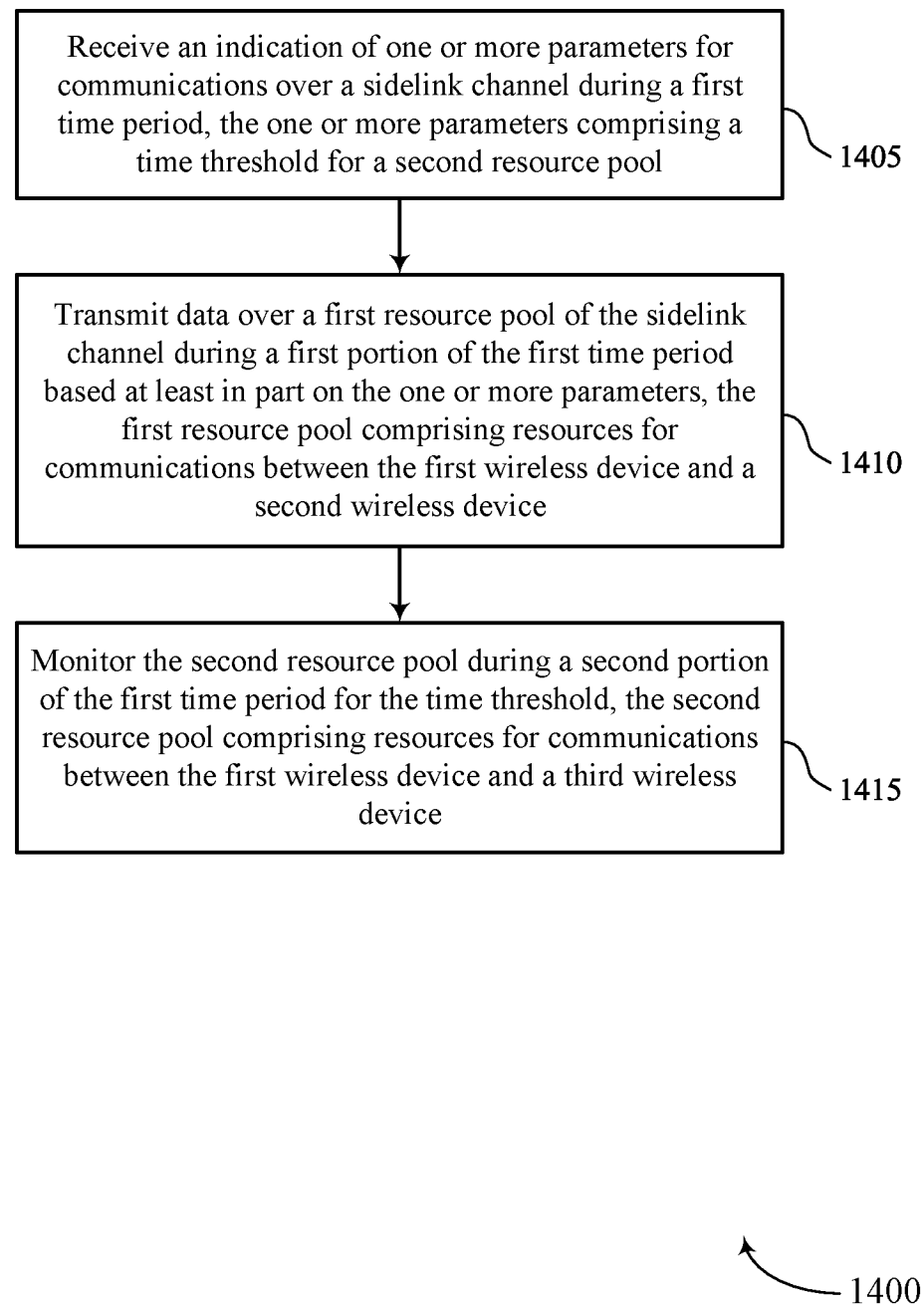

FIG. 14 shows a flowchart illustrating a method 1400 that supports sidelink vehicle to pedestrian techniques for wireless communications systems in accordance with aspects of the present disclosure. The operations of the method 1400 may be implemented by a first wireless device (e.g., a UE 115) or its components as described herein. For example, the operations of the method 1400 may be performed by a communications manager as described with reference to FIGS. 4 through 7. In some examples, a first wireless device may execute a set of instructions to control the functional elements of the first wireless device to perform the described functions. Additionally or alternatively, the first wireless device may perform aspects of the described functions using special-purpose hardware.

At 1405, the method may include receiving an indication of one or more parameters for communications over a sidelink channel during a first time period, the one or more parameters including a time threshold for a second resource pool. The operations of 1405 may be performed in accordance with examples as disclosed herein. In some examples, aspects of the operations of 1405 may be performed by a parameters component as described with reference to FIGS. 4 through 7.

At 1410, the method may include transmitting data over a first resource pool of the sidelink channel during a first portion of the first time period based on the one or more parameters, the first resource pool including resources for communications between the first wireless device and a second wireless device. The operations of 1410 may be performed in accordance with examples as disclosed herein. In some examples, aspects of the operations of 1410 may be performed by a data transmission component as described with reference to FIGS. 4 through 7.

At 1415, the method may include monitoring the second resource pool during a second portion of the first time period for the time threshold, the second resource pool including resources for communications between the first wireless device and a third wireless device. The operations of 1415 may be performed in accordance with examples as disclosed herein. In some examples, aspects of the operations of 1415 may be performed by a monitoring component as described with reference to FIGS. 4 through 7.

Figure 15:
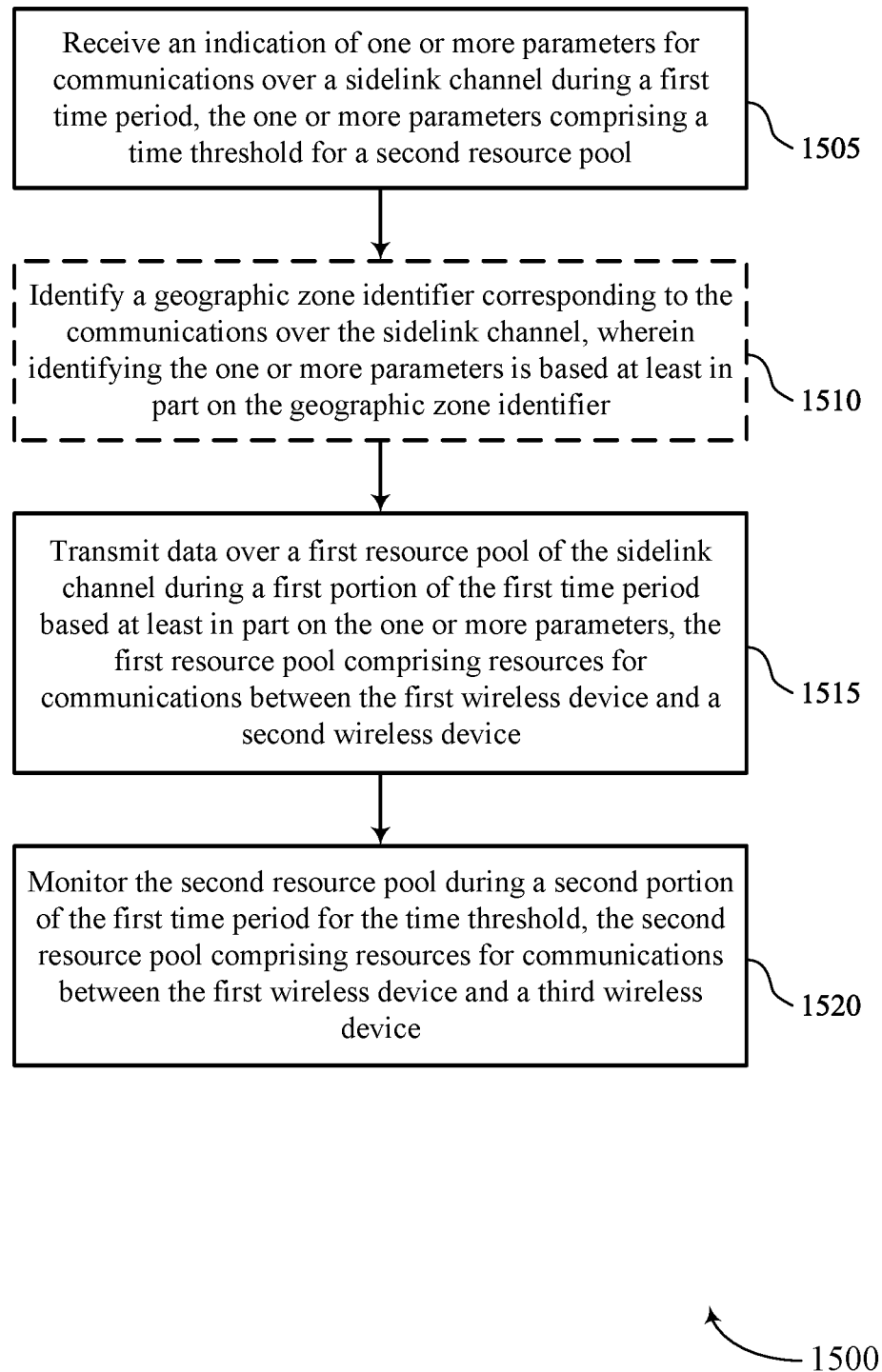

FIG. 15 shows a flowchart illustrating a method 1500 that supports sidelink vehicle to pedestrian techniques for wireless communications systems in accordance with aspects of the present disclosure. The operations of the method 1500 may be implemented by a first wireless device (e.g., a UE 115) or its components as described herein. For example, the operations of the method 1500 may be performed by a first wireless device as described with reference to FIGS. 4 through 7. In some examples, a first wireless device may execute a set of instructions to control the functional elements of the first wireless device to perform the described functions. Additionally or alternatively, the first wireless device may perform aspects of the described functions using special-purpose hardware.

At 1505, the method may include receiving an indication of one or more parameters for communications over a sidelink channel during a first time period, the one or more parameters including a time threshold for a second resource pool. The operations of 1505 may be performed in accordance with examples as disclosed herein. In some examples, aspects of the operations of 1505 may be performed by a parameters component as described with reference to FIGS. 4 through 7.

At 1510, the method may include identifying a geographic zone identifier corresponding to the communications over the sidelink channel, where identifying the one or more parameters is based on the geographic zone identifier. The operations of 1510 may be performed in accordance with examples as disclosed herein. In some examples, aspects of the operations of 1510 may be performed by a zone component as described with reference to FIGS. 4 through 7.

At 1515, the method may include transmitting data over a first resource pool of the sidelink channel during a first portion of the first time period based on the one or more parameters, the first resource pool including resources for communications between the first wireless device and a second wireless device. The operations of 1515 may be performed in accordance with examples as disclosed herein. In some examples, aspects of the operations of 1515 may be performed by a data transmission component as described with reference to FIGS. 4 through 7.

At 1520, the method may include monitoring the second resource pool during a second portion of the first time period for the time threshold, the second resource pool including resources for communications between the first wireless device and a third wireless device. The operations of 1520 may be performed in accordance with examples as disclosed herein. In some examples, aspects of the operations of 1520 may be performed by a monitoring component as described with reference to FIGS. 4 through 7.

Figure 16:
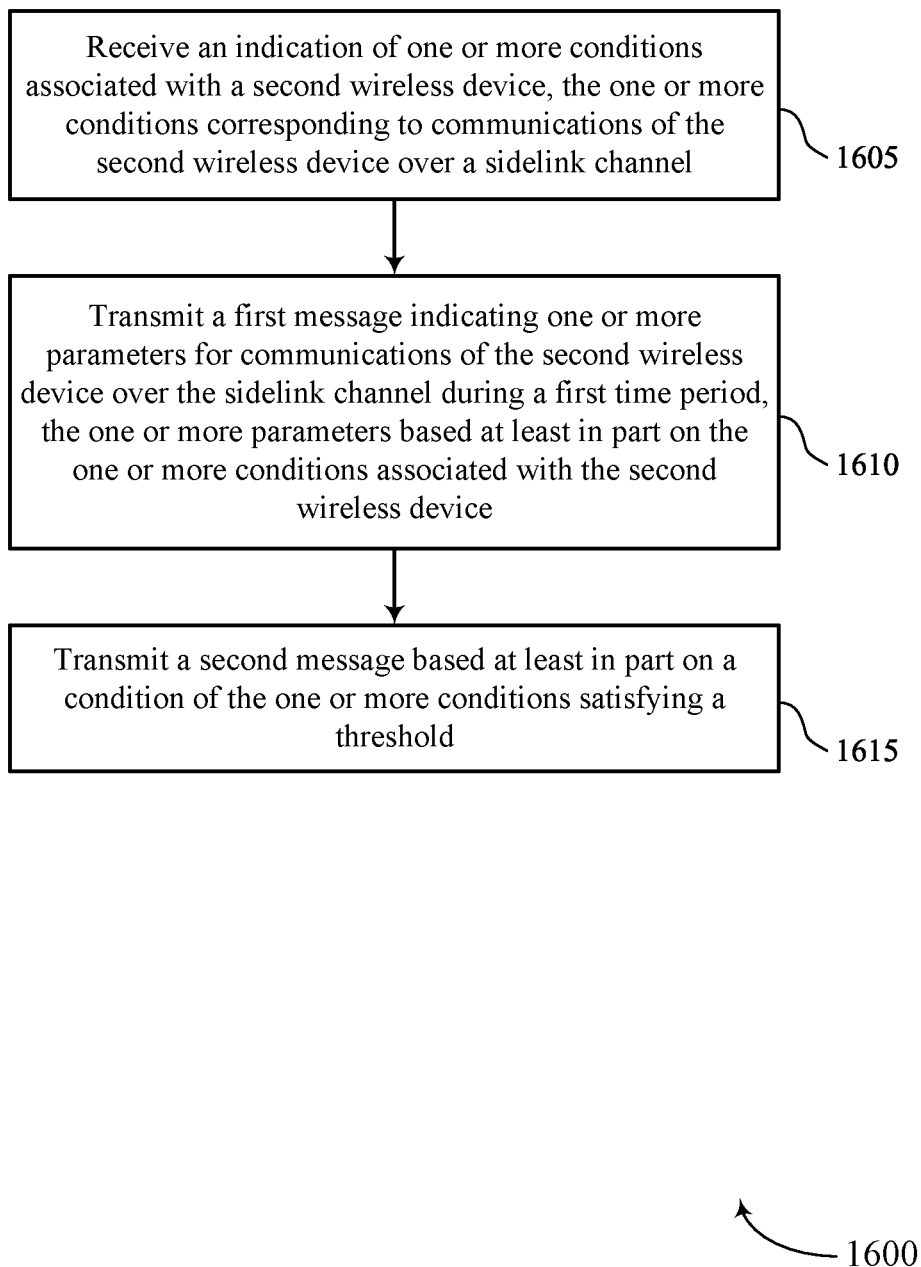

FIG. 16 shows a flowchart illustrating a method 1600 that supports sidelink vehicle to pedestrian techniques for wireless communications systems in accordance with aspects of the present disclosure. The operations of the method 1600 may be implemented by a first wireless device (e.g., an RSU or a base station 105) or its components as described herein. For example, the operations of the method 1600 may be performed by a base station 105 as described with reference to FIGS. 8 through 10. In some examples, a base station may execute a set of instructions to control the functional elements of the base station to perform the described functions. Additionally or alternatively, the base station may perform aspects of the described functions using special-purpose hardware.

At 1605, the method may include receiving an indication of one or more conditions associated with a second wireless device, the one or more conditions corresponding to communications of the second wireless device over a sidelink channel. The operations of 1605 may be performed in accordance with examples as disclosed herein. In some examples, aspects of the operations of 1605 may be performed by a condition indication component as described with reference to FIGS. 8 through 10.

At 1610, the method may include transmitting a first message indicating one or more parameters for communications of the second wireless device over the sidelink channel during a first time period, the one or more parameters based on the one or more conditions associated with the second wireless device. The operations of 1610 may be performed in accordance with examples as disclosed herein. In some examples, aspects of the operations of 1610 may be performed by a parameters module as described with reference to FIGS. 8 through 10.

At 1615, the method may include transmitting a second message based on a condition of the one or more conditions satisfying a threshold. The operations of 1615 may be performed in accordance with examples as disclosed herein. In some examples, aspects of the operations of 1615 may be performed by a control module as described with reference to FIGS. 8 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first wireless device, comprising: receiving an indication of one or more parameters for communications over a sidelink channel during a first time period, the one or more parameters comprising a time threshold for a second resource pool; transmitting data over a first resource pool of the sidelink channel during a first portion of the first time period based at least in part on the one or more parameters, the first resource pool comprising resources for communications between the first wireless device and a second wireless device; and monitoring the second resource pool during a second portion of the first time period for the time threshold, the second resource pool comprising resources for communications between the first wireless device and a third wireless device.

Aspect 2: The method of aspect 1, wherein the first wireless device comprises a vehicle user equipment (UE), the second wireless device comprises a second vehicle UE (V-UE), the third wireless device comprises a UE associated with a vulnerable road user (VRU), or any combination thereof.

Aspect 3: The method of any of aspects 1 through 2, wherein the first wireless device comprises a pedestrian UE (P-UE).

Aspect 4: The method of any of aspects 1 through 3, further comprising: identifying a geographic zone identifier corresponding to the communications over the sidelink channel, wherein identifying the one or more parameters is based at least in part on the geographic zone identifier.

Aspect 5: The method of aspect 4, wherein the one or more parameters indicate a duration of the first portion of the first time period, a duration of the second portion of the first time period, or both.

Aspect 6: The method of any of aspects 4 through 5, further comprising: identifying a second geographic zone identifier at a second time period subsequent the first time period; identifying a set of parameters for communications over the sidelink channel during the second time period based at least in part on the second geographic zone identifier; transmitting second data over the first resource pool of the sidelink channel during a first portion of the second time period based at least in part on the set of parameters; and monitoring the second resource pool during a second portion of the second time period based at least in part on the set of parameters.

Aspect 7: The method of any of aspects 1 through 6, further comprising: calculating a channel busy ratio of the second resource pool; and adapting a priority associated with transmitting the data over the first resource pool, a priority associated with monitoring the second resource pool, or both based at least in part on the calculated channel busy ratio.

Aspect 8: The method of aspect 7, wherein calculating the channel busy ratio comprises: determining, for one or more occasions prior to the first time period, a quantity of sub-channels with a received signal strength indicator that satisfies a configured threshold.

Aspect 9: The method of any of aspects 7 through 8, further comprising: comparing the channel busy ratio to a threshold, wherein adapting the priority associated with transmitting the data over the first resource pool, the priority associated with monitoring the second resource pool, or both is based at least in part on the comparison.

Aspect 10: The method of aspect 9, wherein adapting the priority associated with transmitting the data over the first resource pool comprises: determining that the channel busy ratio fails to satisfy the threshold based at least in part on comparing the channel busy ratio to the threshold; and determining that the first portion of the first time period satisfies a second time threshold associated with transmitting the data over the first resource pool, the second time threshold comprising a percentage of the first time period.

Aspect 11: The method of any of aspects 9 through 10, wherein adapting the priority associated with transmitting the data over the first resource pool comprises: determining that the channel busy ratio satisfies the threshold based at least in part on comparing the channel busy ratio to the threshold; and determining that the second portion of the first time period satisfies the time threshold associated with monitoring the second resource pool, the time threshold comprising a percentage of the first time period.

Aspect 12: The method of any of aspects 1 through 11, further comprising: transmitting, during a second time period, a paging indication to the third wireless device; and communicating with the third wireless device over a third resource pool during a third time period based at least in part on transmitting the paging indication, the third resource pool comprising resources for communications from the first wireless device to the third wireless device.

Aspect 13: The method of aspect 12, wherein the paging indication indicates a duration of the third time period, one or more resources during the third time period allocated for communications between the first wireless device and the third wireless device, or both.

Aspect 14: The method of any of aspects 12 through 13, wherein the first resource pool, the second resource pool, and the third resource pool are frequency division multiplexed during the first time period, the second time period, and the third time period.

Aspect 15: The method of any of aspects 1 through 14, wherein identifying the one or more parameters comprises: receiving a control message indicating the one or more parameters from a base station, a roadside unit, or both.

Aspect 16: The method of aspect 15, wherein the control message comprises a radio resource control (RRC) reconfiguration message.

Aspect 17: The method of any of aspects 1 through 16, wherein the second resource pool comprises a common resource pool for communications between V-UEs and the first resource pool comprises resources for communications between V-UEs and UEs associated with one or more VRUs.

Aspect 18: The method of any of aspects 1 through 17, further comprising: determining that the first portion of the first time period satisfies a threshold quantity of consecutive symbols associated with transmitting the data over the first resource pool.

Aspect 19: The method of aspect 18, further comprising: identifying a second quantity of consecutive symbols based at least in part on the time threshold of the one or more parameters, wherein monitoring the second resource pool during the second portion of the first time period comprises monitoring the second resource pool during the second quantity of consecutive symbols.

Aspect 20: The method of any of aspects 1 through 19, further comprising: determining that the second portion of the first time period satisfies the time threshold associated with monitoring the second resource pool, the time threshold comprising a percentage of the first time period.

Aspect 21: A method for wireless communications at a wireless device, comprising: receiving an indication of one or more conditions associated with a second wireless device, the one or more conditions corresponding to communications of the second wireless device over a sidelink channel; transmitting a first message indicating one or more parameters for communications of the second wireless device over the sidelink channel during a first time period, the one or more parameters based at least in part on the one or more conditions associated with the second wireless device; and transmitting a second message based at least in part on a condition of the one or more conditions satisfying a threshold.

Aspect 22: The method of aspect 21, further comprising: identifying a set of parameters different than the one or more parameters, the set of parameters corresponding to communications of the second wireless device over the sidelink channel during a second time period; and transmitting a third message indicating the set of parameters to the second wireless device.

Aspect 23: The method of any of aspects 21 through 22, wherein the condition comprises a safety condition and the threshold comprises a safety threshold, and the second message comprises safety information.

Aspect 24: The method of any of aspects 21 through 23, wherein transmitting the first message comprises: transmitting a radio resource control (RRC) reconfiguration message indicating the one or more parameters.

Aspect 25: The method of any of aspects 21 through 24, wherein the wireless device comprises a base station, a roadside unit (RSU), or both.

Aspect 26: The method of any of aspects 21 through 25, wherein the second wireless device comprises a vehicle user equipment (UE).

Aspect 27: An apparatus for wireless communications at a first wireless device, comprising a processor; and memory coupled with the processor, the processor and memory configured to perform a method of any of aspects 1 through 20.

Aspect 28: An apparatus for wireless communications at a first wireless device, comprising at least one means for performing a method of any of aspects 1 through 20.

Aspect 29: A non-transitory computer-readable medium storing code for wireless communications at a first wireless device, the code comprising instructions executable by a processor to perform a method of any of aspects 1 through 20.

Aspect 30: An apparatus for wireless communications at a wireless device, comprising a processor; and memory coupled with the processor, the processor and memory configured to perform a method of any of aspects 21 through 26.

Aspect 31: An apparatus for wireless communications at a wireless device, comprising at least one means for performing a method of any of aspects 21 through 26.

Aspect 32: A non-transitory computer-readable medium storing code for wireless communications at a wireless device, the code comprising instructions executable by a processor to perform a method of any of aspects 21 through 26.

Aspect 33: A method for wireless communications at a first wireless device, comprising identifying one or more parameters for communications over a sidelink channel during a first time period; transmitting data over a first resource pool of the sidelink channel during a first portion of the first time period based at least in part on the one or more parameters, the first resource pool comprising resources for communications between the first wireless device and a second wireless device; and monitoring a second resource pool during a second portion of the first time period based at least in part on a time threshold of the one or more parameters, the second resource pool comprising resources for communications between the first wireless device and a third wireless device.

Aspect 34: The method of aspect 33, further comprising: determining that the first portion of the first time period satisfies a threshold quantity of consecutive symbols associated with transmitting the data over the first resource pool.

Aspect 35: The method of any one of aspects 33 through 34, further comprising: identifying a second quantity of consecutive symbols based at least in part on the time threshold of the one or more parameters, wherein monitoring the second resource pool during the second portion of the first time period comprises monitoring the second resource pool during the second quantity of consecutive symbols.

Aspect 36: The method of any one of aspects 33 through 35, further comprising: determining that the second portion of the first time period satisfies the time threshold associated with monitoring the second resource pool, the time threshold comprising a percentage of the first time period.

Aspect 37: The method of any one of aspects 33 through 36, further comprising: identifying a geographic zone identifier corresponding to the communications over the sidelink channel, wherein identifying the one or more parameters is based at least in part on the geographic zone identifier.

Aspect 38: The method of any one of aspects 33 through 37, wherein the one or more parameters indicate a duration of the first portion of the first time period, a duration of the second portion of the first time period, or both.

Aspect 39: The method of any one of aspects 33 through 38, further comprising: identifying a second geographic zone identifier at a second time period subsequent the first time period; identifying a set of parameters for communications over the sidelink channel during the second time period based at least in part on the second geographic zone identifier; transmitting second data over the first resource pool of the sidelink channel during a first portion of the second time period based at least in part on the set of parameters; and monitoring the second resource pool during a second portion of the second time period based at least in part on the set of parameters.

Aspect 39: The method of any one of aspects 33 through 39, further comprising: calculating a channel busy ratio of the second resource pool; and adapting a priority associated with transmitting the data over the first resource pool, a priority associated with monitoring the second resource pool, or both based at least in part on the calculated channel busy ratio.

Aspect 40: The method of any one of aspects 33 through 39, wherein calculating the channel busy ratio comprises: determining, for one or more occasions prior to the first time period, a quantity of subchannels with a received signal strength indicator that satisfies a configured threshold.

Aspect 41: The method of any one of aspects 33 through 40, further comprising: comparing the channel busy ratio to a threshold, wherein adapting the priority associated with transmitting the data over the first resource pool, the priority associated with monitoring the second resource pool, or both is based at least in part on the comparison.

Aspect 42: The method of any one of aspects 33 through 41, wherein adapting the priority associated with transmitting the data over the first resource pool comprises: determining that the channel busy ratio fails to satisfy the threshold based at least in part on comparing the channel busy ratio to the threshold; and determining that the first portion of the first time period satisfies a second time threshold associated with transmitting the data over the first resource pool, the second time threshold comprising a percentage of the first time period.

Aspect 43: The method of any one of aspects 33 through 42, wherein adapting the priority associated with transmitting the data over the first resource pool comprises: determining that the channel busy ratio satisfies the threshold based at least in part on comparing the channel busy ratio to the threshold; and determining that the second portion of the first time period satisfies the time threshold associated with monitoring the second resource pool, the time threshold comprising a percentage of the first time period.

Aspect 44: The method of any one of aspects 33 through 43, further comprising: transmitting, during a second time period, a paging indication to the third wireless device; and communicating with the third wireless device over a third resource pool during a third time period based at least in part on transmitting the paging indication, the third resource pool comprising resources for communications from the first wireless device to the third wireless device.

Aspect 45: The method of any one of aspects 33 through 44, wherein the paging indication indicates a duration of the third time period, one or more resources during the third time period allocated for communications between the first wireless device and the third wireless device, or both.

Aspect 46: The method of any one of aspects 33 through 45, wherein the first resource pool, the second resource pool, and the third resource pool are frequency division multiplexed during the first time period, the second time period, and the third time period.

Aspect 47: The method of any one of aspects 33 through 46, wherein identifying the one or more parameters comprises: receiving a control message indicating the one or more parameters from a base station, a roadside unit, or both.

Aspect 48: The method of any one of aspects 33 through 47, wherein the control message comprises an RRC reconfiguration message.

Aspect 49: The method of any one of aspects 33 through 48, wherein the first wireless device comprises a vehicle UE, the second wireless device comprises a second vehicle UE, the third wireless device comprises a UE associated with a VRU, or any combination thereof.

Aspect 50: The method of any one of aspects 33 through 49, wherein the first resource pool comprises a common resource pool for communications between vehicle UEs and the second resource pool comprises resources for communications between vehicle UEs and UEs associated with one or more VRUs.

Aspect 51: A method for wireless communications at a wireless device, comprising: identifying one or more parameters for communications of a second wireless device over a sidelink channel during a first time period; and transmitting a control message indicating the one or more parameters to the second wireless device.

Aspect 52: The method of aspect 51, wherein transmitting the control message comprises: transmitting an RRC reconfiguration message indicating the one or more parameters.

Aspect 53: The method of any one of aspects 51 through 52, further comprising: identifying a set of parameters different than the one or more parameters, the set of parameters corresponding to communications of the second wireless device over the sidelink channel during a second time period; and transmitting a second control message indicating the set of parameters to the second wireless device.

Aspect 54: The method of any one of aspects 51 through 53, wherein the wireless device comprises a base station, an RSU, or both.

Aspect 55: The method of any one of aspects 51 through 54, wherein the second wireless device comprises a vehicle UE.

Aspect 56: An apparatus for wireless communications at a wireless device comprising at least one means for performing a method of any one of aspects 33 through 50.

Aspect 57: An apparatus for wireless communications at a wireless device comprising a processor, memory coupled to the processor, the processor and memory configured to perform a method of any one of aspects 33 through 50.

Aspect 58: A non-transitory computer-readable medium storing code for wireless communications at a wireless device, the code comprising instructions executable by a processor to perform a method of any of aspects 33 through 50.

Aspect 59: An apparatus for wireless communications at a wireless device comprising at least one means for performing a method of any one of aspects 51 through 55.

Aspect 60: An apparatus for wireless communications at a wireless device comprising a processor, memory coupled to the processor, the processor and memory configured to perform a method of any one of aspects 51 through 55.

Aspect 61: A non-transitory computer-readable medium storing code for wireless communications at a wireless device, the code comprising instructions executable by a processor to perform a method of any of aspects 33 through 55.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless device, comprising:
receiving an indication of one or more parameters for communications over a sidelink channel during a first time period, the one or more parameters comprising a time threshold associated with using a second resource pool;
transmitting data over a first resource pool of the sidelink channel during a first portion of the first time period based at least in part on the one or more parameters, the first resource pool comprising resources associated with communications between wireless devices of a first type of wireless device, the first wireless device and a second wireless device being of the first type of wireless device;
monitoring the second resource pool during a second portion of the first time period for the time threshold, the second resource pool comprising resources associated with communications from wireless devices of a second type of wireless device to wireless devices of the first type of wireless device; and
transmitting, to a third wireless device via an indication resource pool during a second time period, a paging indication that indicates a third resource pool associated with communications from wireless devices of the first type of wireless device to wireless devices of the second type of wireless device, the paging indication transmitted based at least in part on receiving a message from the third wireless device via the second resource pool, the third wireless device being of the second type of wireless device.

2. The method of claim 1, wherein the first type of wireless device is associated with a vehicle user equipments (UEs) and the second type of wireless device is associated with vulnerable road users.

3. The method of claim 1, wherein the third wireless device comprises a pedestrian UE (P-UE).

4. The method of claim 1, further comprising:
identifying a geographic zone identifier corresponding to the communications over the sidelink channel, wherein the one or more parameters are based at least in part on the geographic zone identifier.

5. The method of claim 4, wherein the one or more parameters indicate a duration of the first portion of the first time period, a duration of the second portion of the first time period, or both.

6. The method of claim 4, further comprising:
identifying a second geographic zone identifier at the second time period subsequent the first time period;
identifying a set of parameters for communications over the sidelink channel during the second time period based at least in part on the second geographic zone identifier;
transmitting second data over the first resource pool of the sidelink channel during a first portion of the second time period based at least in part on the set of parameters; and
monitoring the second resource pool during a second portion of the second time period based at least in part on the set of parameters.

7. The method of claim 1, further comprising:
calculating a channel busy ratio of the second resource pool; and
adapting a priority associated with transmitting the data over the first resource pool, a priority associated with monitoring the second resource pool, or both based at least in part on the calculated channel busy ratio.

8. The method of claim 7, the calculating comprising:
determining, for one or more occasions prior to the first time period, a quantity of subchannels with a received signal strength indicator that satisfies a configured threshold.

9. The method of claim 7, further comprising:
comparing the channel busy ratio to a threshold, wherein adapting the priority associated with transmitting the data over the first resource pool, the priority associated with monitoring the second resource pool, or both is based at least in part on the comparison.

10. The method of claim 9, the adapting comprising:
determining that the channel busy ratio fails to satisfy the threshold based at least in part on comparing the channel busy ratio to the threshold; and
determining that the first portion of the first time period satisfies a second time threshold associated with transmitting the data over the first resource pool, the second time threshold comprising a percentage of the first time period.

11. The method of claim 9, the adapting comprising:
determining that the channel busy ratio satisfies the threshold based at least in part on comparing the channel busy ratio to the threshold; and
determining that the second portion of the first time period satisfies the time threshold associated with monitoring the second resource pool, the time threshold comprising a percentage of the first time period.

12. The method of claim 1, further comprising:
communicating with the third wireless device over the third resource pool during a third time period based at least in part on the paging indication.

13. The method of claim 12, wherein the paging indication indicates a duration of the third time period, one or more resources during the third time period allocated for the communications between the first wireless device and the third wireless device, or both.

14. The method of claim 12, wherein the first resource pool, the second resource pool, and the third resource pool are frequency division multiplexed during the first time period, the second time period, and the third time period.

15. The method of claim 1, the receiving comprising:
receiving a control message indicating the one or more parameters from a network node, a roadside unit, or both.

16. The method of claim 15, wherein the control message comprises a radio resource control (RRC) reconfiguration message.

17. The method of claim 1, further comprising:
determining that the first portion of the first time period satisfies a threshold quantity of consecutive symbols associated with transmitting the data over the first resource pool.

18. The method of claim 17, further comprising:
identifying a second quantity of consecutive symbols based at least in part on the time threshold of the one or more parameters, wherein monitoring the second resource pool during the second portion of the first time period comprises monitoring the second resource pool during the second quantity of consecutive symbols.

19. The method of claim 1, further comprising:
determining that the second portion of the first time period satisfies the time threshold associated with monitoring the second resource pool, the time threshold comprising a percentage of the first time period.

20. An apparatus for wireless communications at a first wireless device, comprising:
one or more processors; and
one or more memories coupled with the one or more processors, the one or more processors configured to cause the first wireless device to:
receive an indication of one or more parameters for communications over a sidelink channel in a first time period, the one or more parameters comprise a time threshold associated with use of a second resource pool;
transmit data over a first resource pool of the sidelink channel during a first portion of the first time period based at least in part on the one or more parameters, the first resource pool comprising resources associated with communications between wireless devices of a first type of wireless device, the first wireless device and a second wireless device being of the first type of wireless device;
monitor the second resource pool during a second portion of the first time period for the time threshold, the second resource pool comprising resources associated with communications from wireless devices of a second type of wireless device to wireless devices of the first type of wireless device; and
transmit, to a third wireless device via an indication resource pool during a second time period, a paging indication that indicates a third resource pool associated with communications from wireless devices of the first type of wireless device to wireless devices of the second type of wireless device, the paging indication transmitting based at least in part on receiving a message from the third wireless device via the second resource pool, the third wireless device being of the second type of wireless device.

21. The apparatus of claim 20, wherein the first type of wireless device is associated with vehicle user equipments (UEs), and the second type of wireless device is associated with vulnerable road users.

22. The apparatus of claim 20, wherein the one or more processors are configured to cause the first wireless device to:
identify a geographic zone identifier that corresponds to the communications over the sidelink channel, wherein the one or more parameters are based at least in part on the geographic zone identifier.

23. The apparatus of claim 22, wherein the one or more parameters indicate a duration of the first portion of the first time period, a duration of the second portion of the first time period, or both.

24. The apparatus of claim 22, wherein the one or more processors are configured to cause the first wireless device to:
identify a second geographic zone identifier at the second time period subsequent the first time period;
identify a set of parameters for communications over the sidelink channel in the second time period based at least in part on the second geographic zone identifier;
transmit second data over the first resource pool of the sidelink channel in a first portion of the second time period based at least in part on the set of parameters; and
monitor the second resource pool in a second portion of the second time period based at least in part on the set of parameters.

25. The apparatus of claim 20, wherein the one or more processors are configured to cause the first wireless device to:
calculate a channel busy ratio of the second resource pool; and
adapt a priority associated with the transmission of the data over the first resource pool, a priority to monitor the second resource pool, or both based at least in part on the calculated channel busy ratio.

26. The apparatus of claim 25, wherein the one or more processors are configured to cause the first wireless device to:
determine, for one or more occasions prior to the first time period, a quantity of subchannels with a received signal strength indicator that satisfies a configured threshold.

27. The apparatus of claim 25, wherein the one or more processors are configured to cause the first wireless device to:
compare the channel busy ratio to a threshold, wherein to adapt the priority associated with the transmission of the data over the first resource pool, to adapt the priority to monitor the second resource pool, or both is based at least in part on the comparison of the channel busy ratio to the threshold.

28. The apparatus of claim 27 wherein, to adapt, the one or more processors are configured to cause the first wireless device to:
determine that the channel busy ratio fails to satisfy the threshold based at least in part on the comparison of the channel busy ratio to the threshold; and
determine that the first portion of the first time period satisfies a second time threshold associated with the transmission of the data over the first resource pool, wherein the second time threshold comprises a percentage of the first time period.

29. The apparatus of claim 27, wherein, to adapt, the one or more processors are configured to cause the first wireless device to:
determine that the channel busy ratio satisfies the threshold based at least in part on the comparison of the channel busy ratio to the threshold; and
determine that the second portion of the first time period satisfies the time threshold associated with monitoring the second resource pool, wherein the time threshold comprises a percentage of the first time period.

30. The apparatus of claim 20, wherein the first type of wireless device is associated with vehicle user equipments (UEs) and the second type of wireless device is associated with vulnerable road users.

31. The apparatus of claim 20, wherein the one or more processors are configured to cause the first wireless device to:
communicate with the third wireless device over the third resource pool in a third time period based at least in part on the paging indication.

32. The apparatus of claim 31, wherein the paging indication indicates a duration of the third time period, one or more resources in the third time period allocated for the communications between the first wireless device and the third wireless device, or both.

33. The apparatus of claim 31, wherein the first resource pool, the second resource pool, and the third resource pool are frequency division multiplexed in the first time period, the second time period, and the third time period.

34. The apparatus of claim 20, wherein, to receive, the one or more processors are configured to cause the first wireless device to:
receive a control message that indicates the one or more parameters from a network node, a roadside unit, or both.

35. The apparatus of claim 34, wherein the control message comprises a radio resource control (RRC) reconfiguration message.

36. The apparatus of claim 20, wherein the one or more processors are configured to cause the first wireless device to:
determine that the first portion of the first time period satisfies a threshold quantity of consecutive symbols associated with the transmission of the data over the first resource pool.

37. The apparatus of claim 36, wherein the one or more processors are configured to cause the first wireless device to:
identify a second quantity of consecutive symbols based at least in part on the time threshold of the one or more parameters, wherein, to monitor the second resource pool, the one or more processors are configured to:
monitor the second resource pool in the second quantity of consecutive symbols.

38. The apparatus of claim 20, wherein the one or more processors are configured to cause the first wireless device to:
determine that the second portion of the first time period satisfies the time threshold associated with monitoring the second resource pool, wherein the time threshold comprises a percentage of the first time period.

39. A non-transitory computer-readable medium storing code for wireless communications at a first wireless device, the code comprising instructions executable by one or more processors to cause the first wireless device to:
receive an indication of one or more parameters for communications over a sidelink channel during a first time period, the one or more parameters comprising a time threshold associated with using a second resource pool;
transmit data over a first resource pool of the sidelink channel during a first portion of the first time period based at least in part on the one or more parameters, the first resource pool comprising resources associated with communications between wireless devices of a first type of wireless device, the first wireless device and a second wireless device being of the first type of wireless device;
monitor the second resource pool during a second portion of the first time period for the time threshold, the second resource pool comprising resources associated with communications from wireless devices of a second type of wireless device to wireless devices of the first type of wireless device; and
transmit, to a third wireless device via an indication resource pool during a second time period, a paging indication that indicates a third resource pool associated with communications from wireless devices of the first type of wireless device to wireless devices of the second type of wireless device, the paging indication transmitted based at least in part on receiving a message from the third wireless device via the second resource pool, the third wireless device being of the second type of wireless device.

40. The non-transitory computer-readable medium of claim 39, wherein the first type of wireless device is associated with vehicle user equipments (UEs) and the second type of wireless device is associated with vulnerable road users.

41. The non-transitory computer-readable medium of claim 39, wherein the third wireless device comprises a pedestrian UE (P-UE).

42. The non-transitory computer-readable medium of claim 39, wherein the instructions are further executable by the one or more processors to:
identify a geographic zone identifier corresponding to the communications over the sidelink channel, wherein the one or more parameters are based at least in part on the geographic zone identifier.

43. An apparatus for wireless communications at a first wireless device, comprising:
means for receiving an indication of one or more parameters for communications over a sidelink channel during a first time period, the one or more parameters comprising a time threshold associated with using a second resource pool;
means for transmitting data over a first resource pool of the sidelink channel during a first portion of the first time period based at least in part on the one or more parameters, the first resource pool comprising resources associated with communications between wireless devices of a first type of wireless device, the first wireless device and a second wireless device being of the first type of wireless device;
means for monitoring the second resource pool during a second portion of the first time period for the time threshold, the second resource pool comprising resources associated with communications from wireless devices of a second type of wireless device to wireless devices of the first type of wireless device; and
means for transmitting, to a third wireless device via an indication resource pool during a second time period, a paging indication that indicates a third resource pool associated with communications from wireless devices of the first type of wireless device to wireless devices of the second type of wireless device, the paging indication transmitted based at least in part on receiving a message from the third wireless device via the second resource pool, the third wireless device being of the second type of wireless device.

* * * * *